United States Patent [19]

Murata

[11] Patent Number: 5,753,815
[45] Date of Patent: May 19, 1998

[54] THERMO-SENSITIVE FLOW SENSOR FOR MEASURING FLOW VELOCITY AND FLOW RATE OF A GAS

[75] Inventor: Norihiko Murata, Yokohama, Japan

[73] Assignees: Ricoh Company, Ltd.; Ricoh Seiki Company, Ltd.; Ricoh Elemex Company, Ltd., all of Tokyo, Japan

[21] Appl. No.: 559,089

[22] Filed: Nov. 17, 1995

[30] Foreign Application Priority Data

Nov. 17, 1994 [JP] Japan ..... 6-283064
Feb. 17, 1995 [JP] Japan ..... 7-029232
Mar. 13, 1995 [JP] Japan ..... 7-052161

[51] Int. Cl.$^6$ ..... G01F 1/68
[52] U.S. Cl. ..... 73/204.15; 73/204.26
[58] Field of Search ..... 73/204.15, 204.16, 73/204.17, 204.18, 204.26

[56] References Cited

U.S. PATENT DOCUMENTS

| | | | |
|---|---|---|---|
| 3,713,337 | 1/1973 | Stroman | 73/861.42 |
| 4,080,821 | 3/1978 | Johnston | 73/204.15 X |
| 4,688,424 | 8/1987 | Handtmann et al. | 73/204.26 X |
| 4,803,875 | 2/1989 | Kuhn et al. | 73/204.26 |
| 4,831,876 | 5/1989 | Porth et al. | 73/204.16 |
| 5,108,193 | 4/1992 | Furubayashi | 73/204.26 X |
| 5,184,509 | 2/1993 | Kienzle et al. | 73/204.16 X |
| 5,186,051 | 2/1993 | Stecher et al. | 73/204.26 |
| 5,187,674 | 2/1993 | Bonne | 73/204.26 X |
| 5,193,388 | 3/1993 | Kleinhans | 73/204.16 X |
| 5,237,867 | 8/1993 | Cook, Jr. | 73/204.26 X |
| 5,351,536 | 10/1994 | Uchiyama | 73/204.26 |

FOREIGN PATENT DOCUMENTS 4-48221  2/1992  Japan ..... 73/204.26

*Primary Examiner*—Richard Chilcot
*Assistant Examiner*—Paul D. Amrozowicz
*Attorney, Agent, or Firm*—Oblon, Spivak, McClelland, Maier & Neustadt, P.C.

[57] ABSTRACT

A thermo-sensitive flow sensor includes a bridge circuit, an amplifying circuit and a sensor drive circuit. A bridge circuit adjusting amplifier is further provided and is connected to an output side of the sensor drive circuit for receiving an output therefrom. The output of the sensor drive circuit is adjusted via the bridge circuit adjusting amplifier and is fed back to the bridge circuit so that the balance adjustment of the bridge circuit is automatically performed based on the value fed back to the bridge circuit. An offset voltage adjusting amplifier may be provided instead of, or in addition to, the bridge circuit adjusting amplifier and is connected to the output side of the sensor drive circuit for receiving the output therefrom. The output of the sensor drive circuit is adjusted via the offset voltage adjusting amplifier and is fed back to the amplifying circuit so that the zero-adjustment of an offset voltage of the amplifying circuit is automatically performed based on the value fed back to the amplifying circuit.

35 Claims, 16 Drawing Sheets

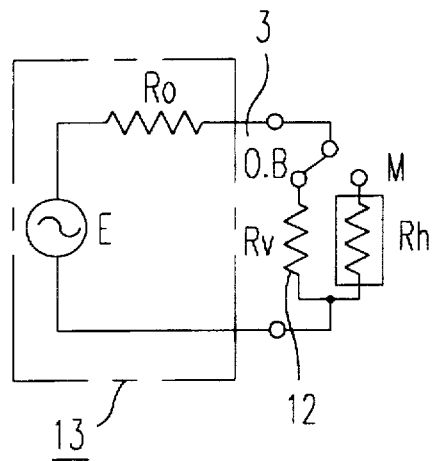
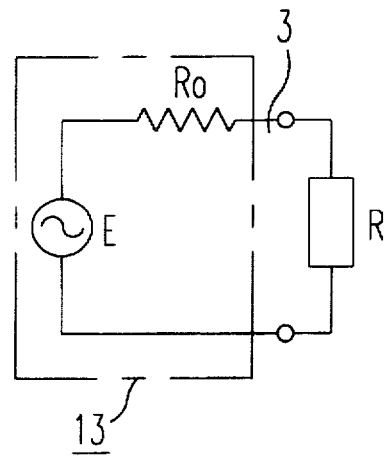
*FIG. 5A*         *FIG. 5B*
              BACKGROUND ART
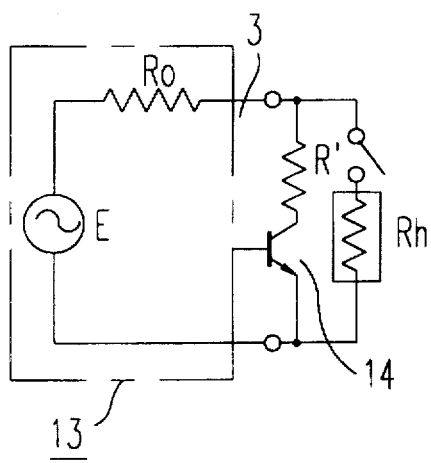
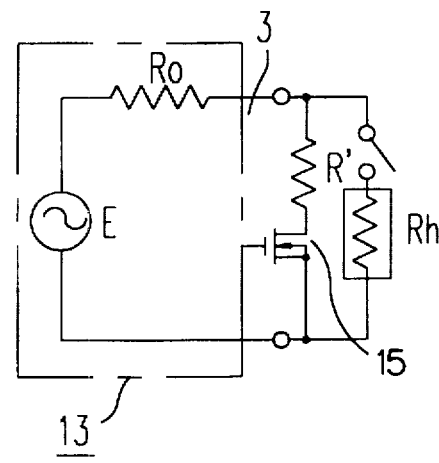
*FIG. 6*          *FIG. 7*

THERMO-SENSITIVE FLOW SENSOR FOR MEASURING FLOW VELOCITY AND FLOW RATE OF A GAS

BACKGROUND OF THE INVENTION

1. Field of the Invention

The present invention relates to a thermo-sensitive flow velocity sensor for measuring a flow velocity of gas based on a temperature variation of the gas due to the flow thereof, and a thermo-sensitive flow sensor for measuring a flow rate of gas based on a flow velocity of the gas.

2. Description of the Prior Art

Thermo-sensitive flowmeters are known, wherein a heating resistor or a heating element is disposed in the flow of fluid to detect a flow rate of the fluid from a temperature distribution generated in a direction of the fluid flow, that is, to measure a flow velocity of the fluid by detecting a variation of calories taken away by the fluid based on calorific values of the heating element. In some of these flowmeters, a compensation resistor or a fluid temperature detecting element is provided for correcting an output variation of the flowmeter caused by changes in fluid temperature or ambient temperature as disclosed in, for example, Japanese First (unexamined) Patent Publications Nos. 56-18381 and 61-274222 and others.

In the Publication No. 56-18381, two beams each formed of a thermal oxide layer are provided close to each other on a substrate of Si or the like. On one of the beams is formed a detection element or a heating element temperature detecting element, while a fluid temperature detecting element having the same characteristics as the heating-element temperature detecting element is formed on the other of the beams so as to perform correction of an output variation due to the temperature variation. On the other hand, in the Publication No. 61-274222, a fluid temperature detecting element formed of a patterned metal film is arranged upstream of a heating element formed on an alumina substrate so as to perform correction of an output variation due to the fluid temperature variation using this fluid temperature detecting element.

FIG. 19 shows an example of a temperature-compensated fluid measuring circuit of a background thermo-sensitive flowmeter for measuring a flow velocity of fluid while correcting an output variation due to fluid temperature variation or the like. The shown circuit includes a Wheatstone bridge circuit 1, an amplifying circuit 2 and a buffer 3. The bridge circuit 1 includes a heating-element temperature detecting element Rs, a fluid temperature detecting element Rf, resistors R1 and R2, a pre-set variable resistor VR and a temperature setting resistor Rt. The amplifying circuit 2 is formed by an operational amplifier (differential amplifier). The buffer 3 includes an npn transistor 4 and a heating element Rh connected to an emitter of the transistor 4.

In the measuring circuit shown in FIG. 19, the fluid temperature detecting element Rf monitors a temperature of the fluid, while the heating-element temperature detecting element Rs monitors a temperature of the heating element Rh. The measuring circuit feeds current from the bridge circuit 1 to the heating element Rh via the amplifying circuit 2 and the transistor 4 so as to hold constant a difference in temperature between the fluid as monitored by the detecting element Rf and the heating element Rh as monitored by the detecting element Rs. Accordingly, the flow velocity of the fluid can be measured from radiant quantities of the heating element Rh with the temperature difference between the fluid and the heating-element temperature detecting element Rs being held constant, while the temperature variation of the fluid is compensated.

In the measuring circuit shown in FIG. 19, the temperature difference between the fluid temperature detecting element Rf and the heating-element temperature detecting element Rs is held constant in the following manner.

First, the bridge circuit 1 is balanced or equilibrated using the pre-set variable resistor VR in a state where the temperature setting resistor Rt is short-circuited by closing a switch SW1 and the heating element Rh is disconnected by opening (OFF) a switch SW2. Subsequently, the switch SW1 is opened to connect the temperature setting resistor Rt and the switch SW2 is closed (ON) to connect the heating element Rh, so as to start measurement of the fluid. A set temperature value $\Delta T$ between the fluid temperature detecting element Rf and the heating-element temperature detecting element Rs is defined by an equation (1) as follows:

$$\Delta T = Rt/(\alpha \cdot Rf) \tag{1}$$

wherein a temperature coefficient of a resistance value of the heating-element temperature detecting element Rs is given by $\alpha$ (/°C.).

The flow velocity of the fluid is measured by feeding the current to the heating element Rh so as to hold $\Delta T$ constant and by deriving an output Vout from a quantity of the current.

However, when the bridge circuit 1 is balanced using the pre-set variable resistor VR, it is possible that the balanced condition of the bridge circuit 1 is impaired with a lapse of time due to a mechanical portion of the pre-set variable resistor VR, to thereby change the set temperature value $\Delta T$. Accordingly, due to an adjusting error or drift in the bridge circuit 1 and/or due to an adjusting error or drift of an offset voltage of the operational amplifier in the amplifying circuit 2, the set temperature value $\Delta T$ may change to affect the measured value of the flow velocity.

On the other hand, there has been available a fluid measuring device in which film resistors forming the bridge circuit 1 are laser-trimmed in advance to adjust a balanced condition of the bridge circuit 1. However, since resistance values of the laser-trimmed film resistors are liable to change as total energization time increases, the balanced condition of the bridge circuit 1 may be deteriorated with a lapse of time to thereby change the set temperature value $\Delta T$.

Further, the offset voltage of the operational amplifier connected to the bridge circuit 1 has its own characteristic value and temperature coefficient, which makes it difficult to hold the set temperature value $\Delta T$ constant.

There have been further proposed thermo-sensitive flow sensors as disclosed in, for example, Japanese First (unexamined) Patent Publications Nos. 56-18381, 60-142268, 61-274222 and 62-30021, Japanese Second (examined) Utility Model Publication No. 5-35289 and others, wherein a bridge structure is formed on a substrate made of Si or the like to provide a bridge (microbridge) on which are arranged a heating element, a pair of temperature detecting elements (an upstream temperature detecting element and a downstream temperature detecting element) interposing the heating element therebetween, and a fluid temperature detecting element provided on the substrate at a position where a thermal influence from the heating element is not liable to occur, so as to measure a flow rate based on a temperature variation of the gas caused by the flow thereof.

The flow sensor disclosed in the Publication No. 6-230021 will be explained with reference to FIG. 20. An electrically insulating film is formed on a substrate 51. A surface of the substrate 51 is etched so as to form a trench 52 and a microbridge 53 across the trench 52. On the microbridge 53 are provided a heating element Rh at a center portion thereof and a heating-element temperature detecting element Rs adjacent to the heating element Rh. An upstream temperature detecting element Ru and a downstream temperature detecting element Rd are further provided on the microbridge 53 at upstream and downstream sides of the heating element Rh and the detecting element Rs relative to the flow direction of the gas, respectively. Further, a fluid temperature detecting element Rf is provided on the insulating film of the substrate 51 at a position where a thermal influence from the heating element Rh is not liable to occur. The fluid temperature detecting element Rf and the heating-element temperature detecting element Rs are connected to a first bridge circuit 54 which, in turn, is connected to an Rh drive circuit 56 via an operational amplifier 55. On the other hand, the upstream temperature detecting element Ru and the downstream temperature detecting element Rd are connected to a second bridge circuit 57. The first and second bridge circuits 54 and 57 are connected via an A/D converter 58 to a memory computing unit 59 where the flow velocity is derived and outputted.

In the flow sensor shown in FIG. 20, the first bridge circuit 54 monitors a temperature difference between the fluid temperature detecting element Rf and the heating-element temperature detecting element Rs and drives the heating element Rh via the Rh drive circuit 56 so as to hold the temperature difference at a constant. The flow velocity is determined based on an output value f1 from the Rh drive circuit 56. On the other hand, a temperature difference between the upstream temperature detecting element Ru and the downstream temperature detecting element Rd is monitored by the second bridge circuit 57. When an output value f2 from the second bridge circuit 57 becomes 0 (zero), the corresponding value f1 is stored in the memory computing unit 59 as determining that the flow velocity at the time of the output value f2 being zero is zero. The stored value is used for zero-point correction so as to ensure accurate computation of the flow velocity.

FIG. 21 shows another background thermo-sensitive flow sensor. In FIG. 21 on a microbridge formed across a trench of a substrate (not shown) are arranged a heating element Rh, an upstream temperature detecting element located upstream of the heating element Rh relative to the flow direction of the gas, and a downstream temperature detecting element Rd located downstream of the heating element Rh. The shown flow-sensor measures a flow rate of the fluid by detecting a temperature difference between the upstream and downstream temperature detecting elements Ru and Rd.

In FIG. 21, the heating element Rh is driven by an Rh drive circuit 60. The upstream and downstream temperature detecting elements Ru and Rd constitute a Wheatstone bridge circuit 61, along with fixed resistors (reference resistances) R1 and R2. The bridge circuit 61 is balanced or equilibrated while the power supply to the heating element Rh is stopped. The balanced condition of the bridge circuit 61 is confirmed by an output voltage $V_{d-u}$ of a differential amplifier 62. In the balanced condition, a relationship defined by an equation (2) is established as follows:

$$R1\, R_{do} = R2\, R_{uo} \qquad (2)$$

wherein Ruo represents a resistance value of the upstream temperature detecting element at a reference temperature, and Rdo represents a resistance value of the downstream temperature detecting element at a reference temperature.

After balancing the bridge circuit 61, the heating element Rh is heated to start measurement of the flow rate. When the flow rate is zero, the heat from the heating element Rh is equally diffused to the upstream and downstream temperature detecting elements Ru and Rd so that the output voltage $V_{d-u}$ of the differential amplifier 62 indicative of a pressure difference between the upstream and downstream temperature detecting elements Ru and Rd becomes zero. On the other hand, when the flow of the gas is generated, the gas flow takes away the heat relative to the upstream temperature detecting element Ru so that a temperature of the upstream detecting element Ru decreases as compared with the flow rate being zero. In this case, since the gas flow carries the heat from the heating element Rh to the downstream temperature detecting element Rd, a temperature of the downstream temperature detecting element Rd increases as compared with the flow rate being zero. FIG. 22 shows temperature variations of the upstream and downstream temperature detecting elements Ru and Rd relative to flow rates of the gas. A value of the output voltage $V_{d-u}$ of the different amplifier 62 is given by an equation (3) as follows.

$$\begin{aligned} V_{d-u} &= \left\{ \frac{Rdo(1+\alpha\Delta Td)}{R2+Rdo(1+\alpha\Delta Td)} - \frac{Ruo(1+\alpha\Delta Tu)}{R1+Ruo(1+\alpha\Delta Tu)} \right\} \cdot V_{sp} \\ &= \frac{R1\,Rdo(1+\alpha\Delta Td) - R2\,Ruo(1+\alpha\Delta Tu)}{\{R2+Rdo(1+\alpha\Delta Td)\}\{R1+Ruo(1+\alpha\Delta Tu)\}} \cdot V_{sp} \end{aligned} \qquad (3)$$

wherein $\alpha$ represents a temperature coefficient of each of the upstream and downstream temperature detecting elements at a reference temperature, $\Delta Tu$ repents a temperature variation of the upstream temperature detecting element from the reference temperature, $\Delta Td$ represents a temperature variation of the downstream temperature detecting element from the reference temperature, and Vsp represents a voltage applied to the bridge circuit 61.

From the equations (2) and (3), assuming that the heat diffusion from the heating element Rh at the time of the flow rate being zero is symmetrical relative to the gas flow direction to establish $V_{d-u}=0$. Thus, an output of the flow sensor becomes zero when the flow rate is zero.

However, due to an initial adjusting error of the bridge circuit (bridge circuit 61, first and second bridge circuits 54 and 57) and/or due to a time-dependent variation of each resistor of the bridge circuit, the output of the flow sensor tends to drift. In view of this, there has been available a flow sensor in which film resistors forming the bridge circuit are laser-trimmed in advance to adjust a balanced condition of the bridge circuit. However, resistance values of the laser-trimmed film resistors are liable to change with a lapse of time, and thus the balanced condition of the bridge circuit may also be deteriorated with a lapse of time.

On the other hand, in the Publication No. 5-35289, a flow sensor is provided with means for stopping the power supply to a heating element so as to produce a reference input state and means for storing a sensor output (error signal) obtained in the reference input state. The flow rate is determined by subtracting the error signal from an output obtained during the measurement. However, if the balanced condition of the bridge circuit is impaired with a lapse of time so that a difference $\epsilon$ is generated between voltages across the upstream temperature detecting element Ru and the downstream temperature detecting element Rd at the time of the heating element Rh being not heated as expressed by an equation (4) as follows:

$$\epsilon = \left( \frac{Rdo}{R2+Rdo} - \frac{Ruo}{R1+Ruo} \right) \cdot Vsp \quad (4)$$

then, a difference $\epsilon'$ between voltages across Ru and Rd at the time of the heating element Rh being heated is, assuming that $\Delta Tu=\Delta Td=\Delta T$ is established, expressed by an equation (5) as follows:

$$\begin{aligned}\epsilon' &= \frac{(R1Rdo - R2Ruo)(1+\alpha\Delta T)}{\{R2+Rdo(1+\alpha\Delta T)\}\{R1+Ruo(1+\alpha\Delta T)\}} \cdot Vsp \quad (5)\\ &= \frac{(R2+Rdo)(R1+Ruo)}{\{R2+Rdo(1+\alpha\Delta T)\}\{R1+Ruo(1+\alpha\Delta T)\}} \cdot (1+\alpha\Delta T) \cdot \epsilon\end{aligned}$$

As appreciated from this equation, $\epsilon' \neq \epsilon$ is clear so that it is impossible to fully eliminate the detection error using the method taught in the Publication No. 5-35289.

SUMMARY OF THE INVENTION

Accordingly, it is one object of the present invention to provide a novel and improved thermo-sensitive flow velocity sensor.

It is another object of the present invention to provide a novel and improved thermo-sensitive flow sensor.

According to one aspect of the present invention, a thermo-sensitive flow velocity sensor includes a heating element and a heating-element temperature detecting element provided on a beam formed by etching a substrate. A fluid temperature detecting element is provided on the substrate near the beam for measuring a temperature of fluid. An output value from a bridge circuit, including the heating-element temperature detecting element, the fluid temperature detecting element and resistors, is fed to a sensor drive circuit via an amplifying circuit. A flow velocity of the fluid is measured from radiant quantities of the heating element which is connected to the sensor drive circuit. The thermo-sensitive flow velocity sensor further includes adjusting means provided at an output side of the sensor drive circuit for adjusting an output value of the bridge circuit.

According to another aspect of the present invention, a thermosensitive flow velocity sensor includes a heating element and a heating element temperature detecting element provided on a beam formed by etching a substrate. A fluid temperature detecting element is provided on the substrate near the beam for measuring a temperature of fluid. An output value from a bridge circuit, including the heating-element temperature detecting element, the fluid temperature detecting element and resistors, is fed to a sensor drive circuit via an amplifying circuit. A flow velocity of the fluid is measured from radiant quantities of the heating element which is connected to the sensor drive circuit. The thermo-sensitive flow velocity sensor further includes adjusting means provided at an output side of the sensor drive circuit for adjusting an offset voltage of the amplifying circuit.

According to another aspect of the present invention, a thermosensitive flow velocity sensor includes a heating element and a heating-element temperature detecting element provided on a beam formed by etching a substrate. A fluid temperature detecting element is provided on the substrate near the beam for measuring a temperature of fluid. An output value from a bridge circuit, including the heating-element temperature detecting element, the fluid temperature detecting element and resistors, is fed to a sensor drive circuit via an amplifying circuit. A flow velocity of the fluid is measured from radiant quantities of the heating element which is connected to the sensor drive circuit. The thermo-sensitive flow velocity sensor further includes first adjusting means provided at an output side of the sensor drive circuit for adjusting an output value of the bridge circuit and second adjusting means provided at the output side of the sensor drive circuit for adjusting an offset voltage of the amplifying circuit.

According to another aspect of the present invention, a thermo-sensitive flow sensor includes a microbridge formed across a trench on a substrate. A heating element is provided on the microbridge. An upstream temperature detecting element is provided upstream of the heating element in a gas flow direction and a downstream temperature detecting element is provided downstream of the heating element in the gas flow direction. A flow rate of the gas is measured by detecting a temperature difference between the upstream and downstream temperature detecting elements. The thermo-sensitive flow sensor further includes drive stopping means for stopping a power supply to the heating element, a temperature-difference detecting bridge circuit including the upstream and downstream temperature detecting elements and reference resistors, each of which is connected in series to a corresponding one of the upstream and downstream temperature detecting elements, and bridge adjusting means for performing an output adjustment of the temperature-difference detecting bridge circuit while the power supply to the heating element is stopped by the drive stopping means.

According to another aspect of the present invention, a thermo-sensitive flow sensor includes a microbridge formed across a trench on a substrate. A heating element is provided on the microbridge. An upstream temperature detecting element is provided upstream of the heating element in a flow direction of gas and a downstream temperature detecting element is provided downstream of the heating element in the gas flow direction. A flow rate of the gas is measured by detecting a temperature difference between the upstream and downstream temperature detecting elements. The thermo-sensitive flow sensor further includes drive stopping means for stopping a power supply to the heating element, a temperature-difference detecting constant current circuit for feeding a constant current to each of the upstream and downstream temperature detecting elements, and constant current adjusting means for rendering voltages across the upstream temperature detecting element and the downstream temperature detecting element equal to each other while the power supply to the heating element is stopped by the drive stopping means.

According to another aspect of the present invention, a thermo-sensitive flow sensor includes a fluid temperature detecting element provided on an electrically insulating film of a substrate. A microbridge is formed across a trench on the substrate. A heating element is provided on the microbridge. A heating-element temperature detecting element is provided near the heating element. An upstream temperature detecting element is provided upstream of the heating element in a flow direction of gas and a downstream temperature detecting element is provided downstream of the heating element in the gas flow direction. A flow rate of the gas is measured by detecting a temperature difference between the upstream and downstream temperature detecting elements. The thermo-sensitive flow sensor further includes drive control means for controlling a power supply to the heating element so as to hold constant a temperature difference between the fluid temperature detecting element and the heating-element temperature detecting element, drive stopping means for stopping the power supply to the heating element, a temperature-difference detecting bridge circuit, including the upstream and downstream temperature detecting elements, and reference resistors, each of which is connected in series to a corresponding one of the upstream and downstream temperature detecting elements. A bridge adjusting means performs an output adjustment of the temperature-difference detecting bridge circuit while the power supply to the heating element is stopped by the drive stopping means.

According to another aspect of the present invention, a thermo-sensitive flow sensor includes a fluid temperature detecting element provided on an electrically insulating film of a substrate. A microbridge is formed across a trench on the substrate. A heating element is provided on the microbridge and a heating-element temperature detecting element is provided near the heating element. An upstream temperature detecting element is provided upstream of the heating element in a flow direction of gas and a downstream temperature detecting element is provided downstream of the heating element in the gas flow direction. A flow rate of the gas is measured by detecting a temperature difference between the upstream and downstream temperature detecting elements.

The thermo-sensitive flow sensor further includes drive control means for controlling a power supply to the heating element so as to hold constant a temperature difference between the fluid temperature detecting element and the heating-element temperature detecting element, drive stopping means for stopping the power supply to the heating element, a temperature-difference detecting constant current circuit for feeding a constant current to each of the upstream and downstream temperature detecting elements, and constant current adjusting means for rendering voltages across the upstream temperature detecting element and the downstream temperature detecting element equal to each other while the power supply to the heating element is stopped by the drive stopping means.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5A is a showing a flow velocity measuring circuit provided with a virtual load resistor in a thermo-sensitive flow velocity sensor according to a sixth preferred embodiment of the present invention;

FIG. 5B is a diagram showing a background flow velocity measuring circuit;

FIG. 6 is a diagram showing a flow velocity measuring circuit provided with a common-emitter circuit in a thermo-sensitive flow velocity sensor according to a seventh preferred embodiment of the present invention;

FIG. 7 is a diagram showing a flow velocity measuring circuit provided with a common-source circuit in a thermo-sensitive flow velocity sensor according to a modification of the seventh preferred embodiment;

DESCRIPTION OF THE PREFERRED EMBODIMENT

Now, preferred embodiments of the present invention will be described hereinbelow with reference to the accompanying drawings.

Figure 1:
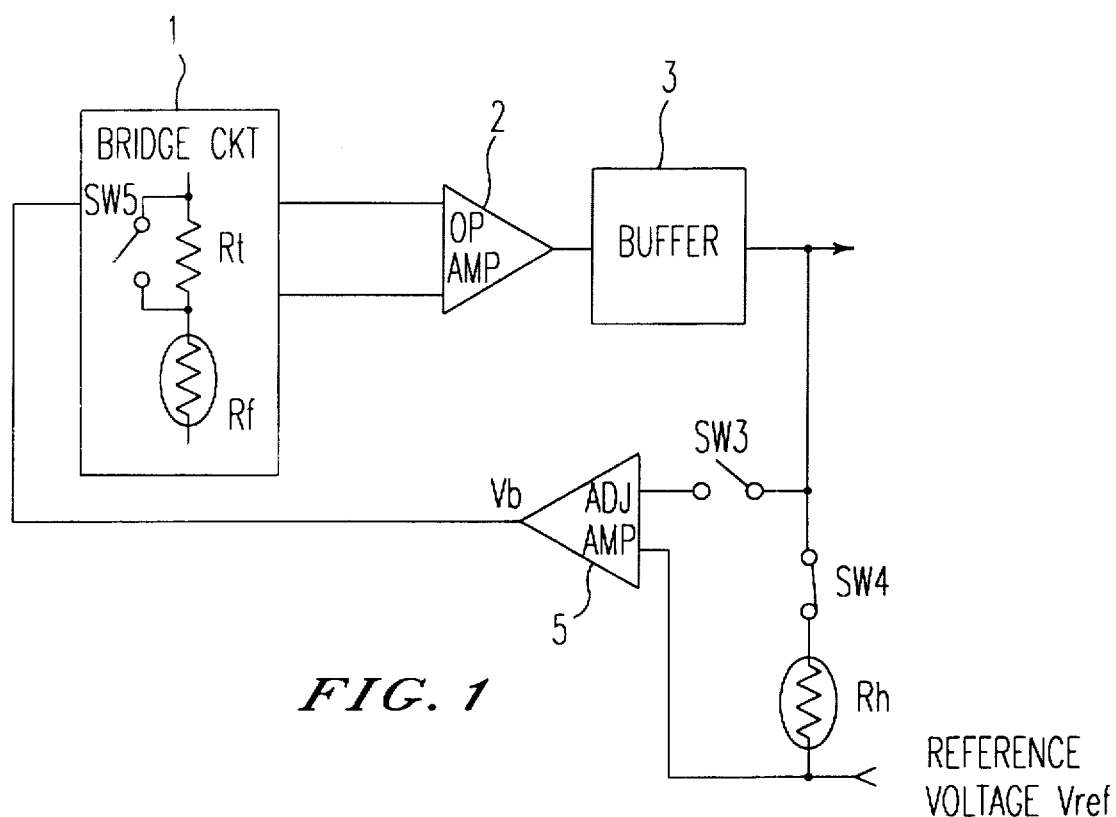
FIG. 1 is a diagram showing a flow velocity measuring circuit with a bridge circuit adjusting function in a thermo-sensitive flow velocity sensor according to a first preferred embodiment of the present invention.
Figure 19:
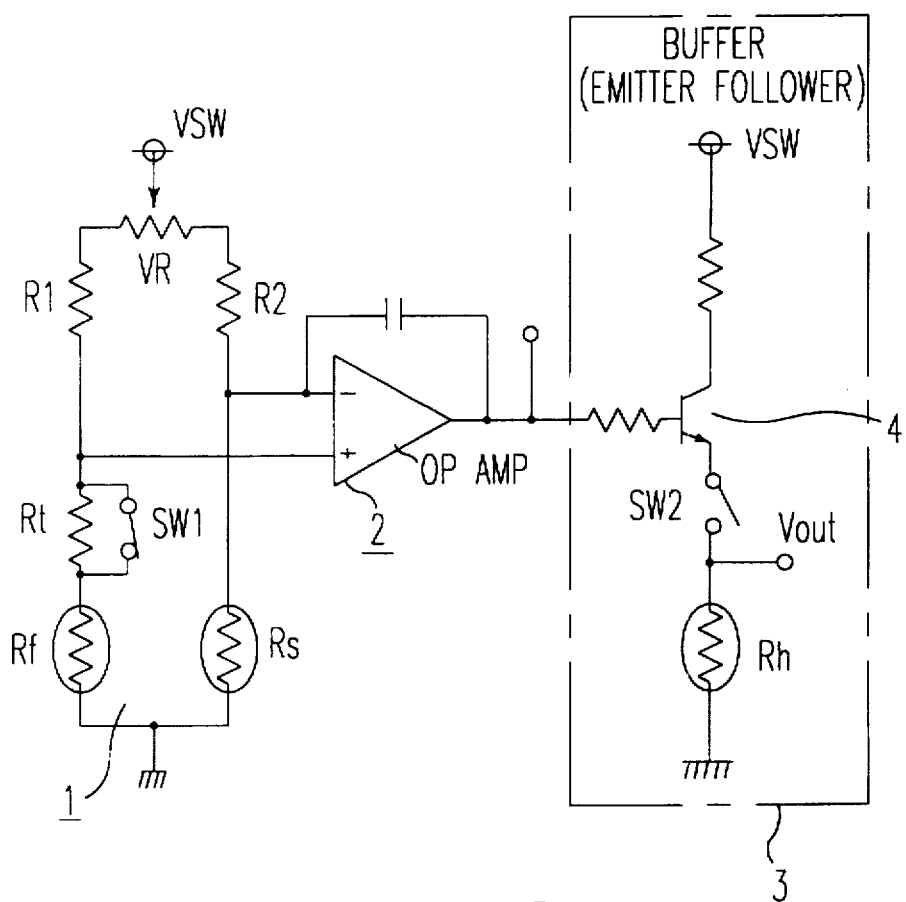
FIG. 19 is a diagram showing a temperature-compensated fluid measuring circuit of a background thermo-sensitive flowmeter.

FIG. 1 shows a first preferred embodiment of the present invention. In the first preferred embodiment, the same or like elements are represented by the same reference signs as those used in FIG. 19 so as to omit explanation thereof.

A thermo-sensitive flow velocity sensor includes a substrate (not shown) coated with an electrically insulating film. The substrate is etched so as to provide a trench and a microbridge of the insulating film across the trench. On the microbridge, a heating element Rh and a heating-element temperature detecting element Rs (not shown) are provided. A fluid temperature detecting element Rf for measuring a temperature of the fluid is provided on the insulating film of the substrate at the upstream side of the heating element Rh and the heating-element temperature detecting element Rs.

FIG. 1 shows a structure of a flow velocity measuring circuit with a bridge circuit adjusting function in the thermo-sensitive flow velocity sensor. This circuit includes a basic transfer route having a bridge circuit 1, an operational amplifier 2 as an amplifying circuit and a buffer 3 as a sensor drive circuit, like the background art shown in FIG. 19, and further includes a feedback route having a bridge circuit adjusting amplifier 5. The bridge circuit adjusting amplifier 5 has two input terminals, one of which is connected to an output terminal of the buffer 3 via a switch SW3, and the other of which is connected to a terminal inputted with a reference voltage Vref. Between the terminal inputted with the reference voltage Vref and the output terminal of the buffer 3 are connected in series a switch SW4 and the heating element Rh. An output terminal of the bridge circuit adjusting amplifier 5 is connected to the bridge circuit 1. With this arrangement, the bridge circuit adjusting amplifier 5 and a circuit in which a resistance value provided at a side of the bridge circuit 1 changes in response to a control voltage Vb (or a control current) outputted from the adjusting amplifier 5, constitute a bridge circuit adjusting unit. A transistor circuit including an npn transistor or an FET may be used as a circuit which changes resistance value (see FIG. 9 referred to later).

In the structure as described above, the bridge circuit adjusting amplifier 5 operates as follows.

In a B mode where the bridge circuit 1 is adjusted to be balanced, the switch SW3 is closed (ON), the switch SW4 is opened (OFF) and further the switch SW5 is closed to short-circuit a temperature setting resistor Rt. Specifically, an output of the operational amplifier 2 or the buffer 3 is connected to the bridge circuit adjusting amplifier 5 in the feedback route to form a closed loop, while the temperature setting resistor Rt is short-circuited.

Accordingly, an output value from the buffer 3 is compared with the reference voltage Vref so that the control voltage Vb is outputted from the bridge circuit adjusting amplifier 5. The bridge circuit 1 is adjusted to be balanced using the transistor circuit which changes the resistance value depending on the control voltage Vb from the bridge circuit adjusting amplifier 5. The balance adjustment of the bridge circuit 1 is repeated until the output value of the operational amplifier 2 or the buffer 3 becomes equal to the reference voltage Vref, so as to achieve automatic balance adjustment of the bridge circuit 1.

While the bridge circuit 1 is balanced, the switch SW3 is opened, the switch SW4 is closed to connect the heating element Rh, and the switch SW5 is opened to connect the temperature setting resistor Rt so that measurement of a flow velocity of the fluid is started. Although the bridge circuit adjusting amplifier 5 is disconnected during the measurement of the flow velocity, the adjusting amplifier 5 holds the control voltage Vb achieved upon completion of the balance adjustment. Accordingly, even when the resistance value of the bridge circuit 1 changes with a lapse of time, the set temperature value ΔT given by the foregoing equation (1) can be held substantially constant. This makes it possible at all times to perform the measurement of the fluid while the bridge circuit 1 is balanced so that the output of the sensor can be rendered stable.

Now, a second preferred embodiment of the present invention will be described hereinbelow with reference to FIG. 2. In the second preferred embodiment, the same or like elements are represented by the same reference signs as those used in FIG. 1 so as to omit explanation thereof.

Figure 2:
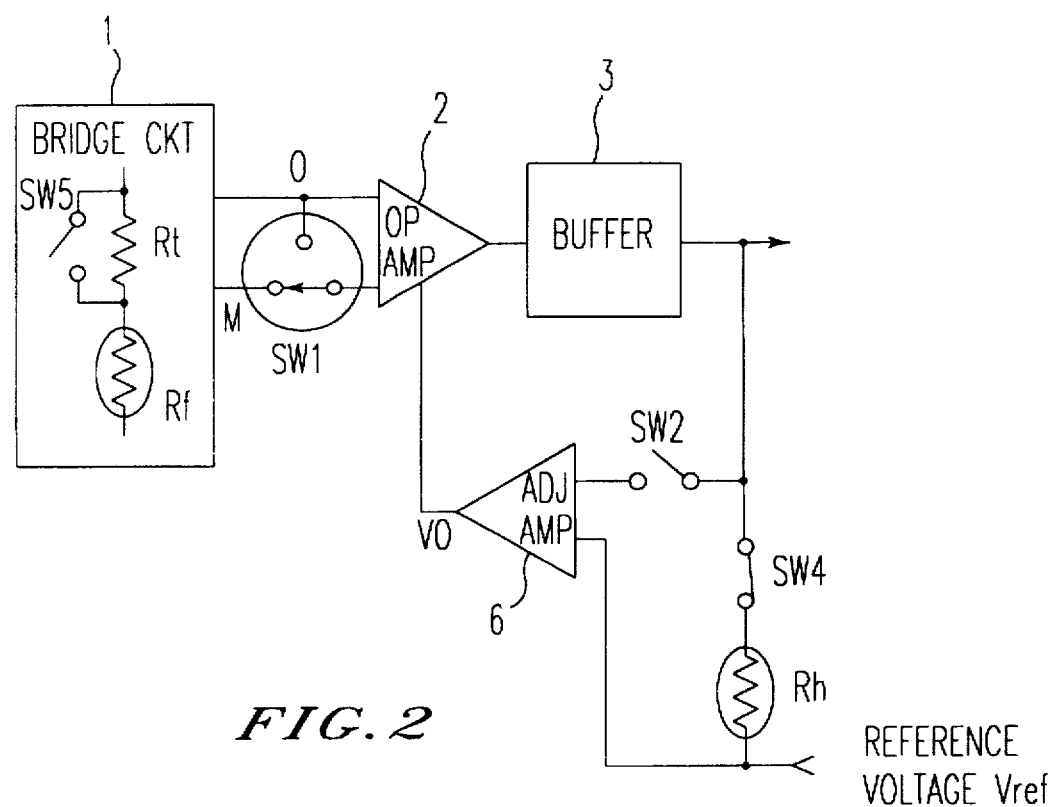
FIG. 2 is a diagram showing a flow velocity measuring circuit with an offset voltage adjusting function in a thermo-sensitive flow velocity sensor according to a second preferred embodiment of the present invention.

FIG. 2 shows a structure of a flow velocity measuring circuit with an offset voltage adjusting function in the thermo-sensitive flow velocity sensor. This circuit includes a basic transfer route having a bridge circuit 1, an operational amplifier 2 and a buffer 3, and further includes a feedback route having an offset voltage adjusting amplifier 6. The offset voltage adjusting amplifier 6 has two input terminals, one of which is connected to an output terminal of the buffer 3 via a switch SW2, and the other of which is connected to a terminal inputted with a reference voltage Vref. Between the terminal inputted with the reference voltage Vref and the output terminal of the buffer 3 are connected in series a switch SW4 and the heating element Rh. An output terminal of the offset voltage adjusting amplifier 6 is connected to the operational amplifier 2. Further, between the bridge circuit 1 and the operational amplifier 2 is connected a switch SW1 which is switchable between an O mode and an M mode. With this arrangement, the offset voltage adjusting amplifier 6 and a circuit in which a resistance value provided at a side of the operational amplifier 2 changes in response to a control voltage Vo (or a control current) outputted from the adjusting amplifier 6, constitute a offset voltage adjusting unit. A transistor circuit including an npn transistor or an FET may be used as the circuit which changes the resistance value (see FIG. 9 referred to later).

In the structure as described above, the offset voltage adjusting amplifier 6 operates as follows.

In the O mode where the offset voltage is adjusted, the switch SW1 is switched to an O side, the switch SW2 is closed and the further switches SW4 and SW5 are opened. Specifically, an output of the operational amplifier 2 or the buffer 3 is connected to the offset voltage adjusting amplifier 6 in the feedback route to form a closed loop, while the two input terminals of the operational amplifier 2 are short-circuited to each other. Accordingly, based on the control voltage Vo outputted from the offset voltage adjusting amplifier 6, the offset voltage is controlled to approach zero. The offset voltage control is repeated until the output value of the operational amplifier 2 or the buffer 3 becomes equal to the reference voltage Vref, so as to achieve automatic zero adjustment of the offset voltage of the operational amplifier 2.

While the offset voltage of the operational amplifier 2 is controlled at zero, the switch SW1 is switched to an M side, the switch SW2 is opened, the switch SW4 is closed to connect the heating element Rh, and the switch SW5 is opened to connect the temperature setting resistor Rt so that measurement of a flow velocity of the fluid is started. Although the offset voltage adjusting amplifier 6 is disconnected during the measurement of the flow velocity, the adjusting amplifier 6 holds the control voltage Vo achieved upon completion of the zero-adjustment of the offset voltage. Accordingly, the measurement of the fluid can be performed at all times while the offset voltage of the operational amplifier 2 is controlled at zero so that the time-dependent variation of the bridge circuit 1 can be reduced. Thus, the output of the sensor can be rendered stable.

Now, a third preferred embodiment of the present invention will be described hereinbelow with reference to FIG. 3. In the third preferred embodiment, the same or like elements are represented by the same reference signs as those used in the foregoing preferred embodiments so as to omit explanation thereof.

Figure 3:
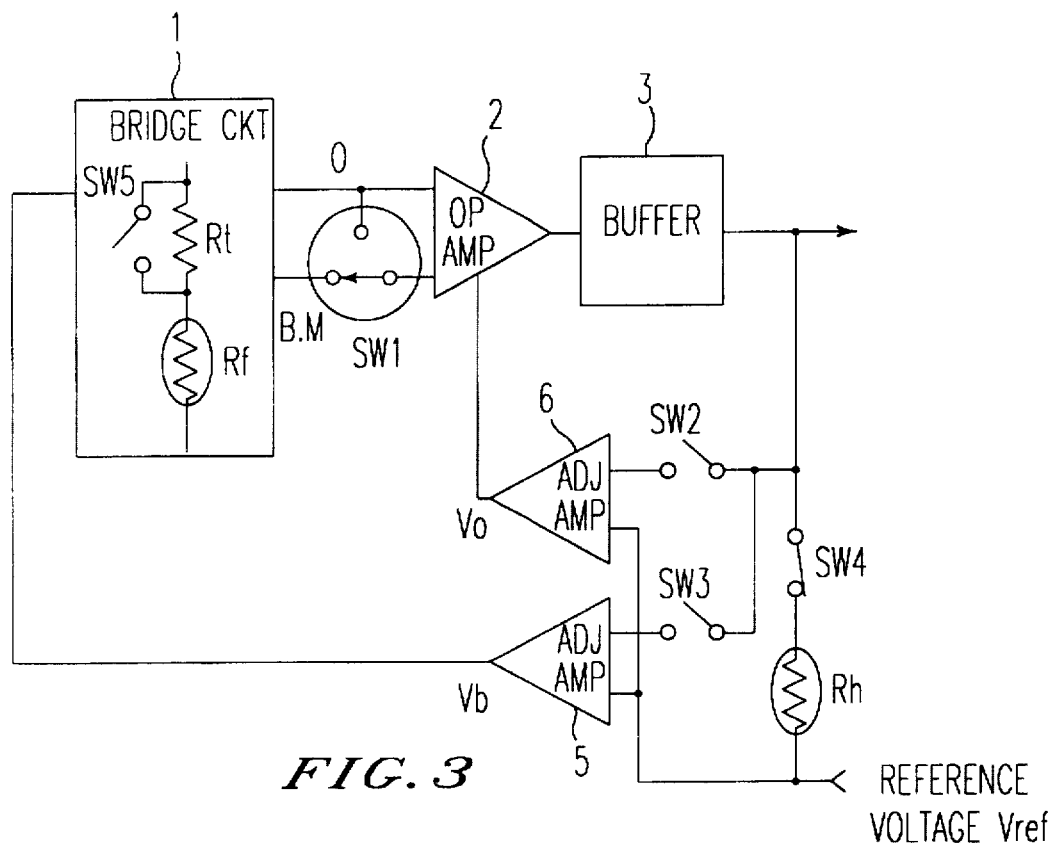
FIG. 3 is a diagram showing a flow velocity measuring circuit with a bridge circuit adjusting function and an offset voltage adjusting function in a thermo-sensitive flow velocity sensor according to a third preferred embodiment of the present invention.

FIG. 3 shows a structure of a flow velocity measuring circuit with a bridge circuit adjusting function and an offset voltage adjusting function in the thermo-sensitive flow velocity sensor. This circuit includes a basic transfer route having a bridge circuit 1, an operational amplifier 2 and a buffer 3, and further includes feedback routes having a bridge circuit adjusting amplifier 5 and an offset voltage adjusting amplifier 6, respectively. With this arrangement, the bridge circuit adjusting amplifier 5 and a circuit in which a resistance value provided at a side of the bridge circuit 1 changes in response to a control voltage Vb (or a control current) outputted from the adjusting amplifier 5, constitute a first adjusting unit, and the offset voltage adjusting amplifier 6 and a circuit in which a resistance value provided at a side of the operational amplifier 2 changes in response to a control voltage Vo (or a control current) outputted from the adjusting amplifier 6, constitute a second adjusting unit. A transistor circuit including an npn transistor or an FET may be used as a circuit which changes resistance value (see FIG. 9 referred to later).

In the structure as described above, the bridge circuit adjusting amplifier 5 and the offset voltage adjusting amplifier 6 operate as follows.

In the O mode where the offset voltage is adjusted, the switch SW1 is switched to an O side, the switch SW2 is closed and the further switches SW3, SW4 and SW5 are opened so as to perform the automatic zero adjustment of the offset voltage of the operational amplifier 2. On the other hand, in the B mode where the bridge circuit 1 is adjusted to be balanced, the switch SW1 is switched to a B side, the switches SW2 and SW4 are opened, and the further switches SW3 and SW5 are closed so as to perform the automatic balance adjustment of the bridge circuit 1.

While the offset voltage of the operational amplifier 2 is controlled at zero and the bridge circuit 1 is balanced, the switch SW1 is switched to an M side, the switches SW2 and SW3 are opened, the switch SW4 is closed to connect the heating element Rh, and the switch SW5 is opened to connect the temperature setting resistor Rt so that measurement of a flow velocity of the fluid is started. Although the offset voltage adjusting amplifier 6 and the bridge circuit adjusting amplifier 5 are disconnected during the measurement of the flow velocity, they hold the control voltages Vo and Vb achieved upon completion of the adjustments, respectively. Accordingly, the measurement of the fluid can be performed at all times while the bridge circuit 1 the offset voltage of the operational amplifier 2 are adjusted, respectively, so that the time-dependent variation of the bridge circuit 1 can be further reduced. Thus, the stability of the output of the sensor can be further improved.

In this embodiment, switching means (not shown, see FIG. 10 referred to later) may be provided for switching connection states of the circuit in order of the adjustment of the offset voltage of the operational amplifier 2, the balance adjustment of the bridge circuit 1 and the measurement of the fluid.

The reason for performing the offset voltage adjustment first is as follows.

If the balance adjustment of the bridge circuit 1 is performed prior to the offset voltage adjustment, since the offset voltage exists upon adjustment of the bridge circuit 1, the output of the operational amplifier 2 or the buffer 3 becomes equal to the reference voltage Vref at a point where the bridge circuit 1 is not actually balanced. Accordingly, the offset voltage adjustment is performed first, and thereafter, the balance adjustment of the bridge circuit 1 is performed so that the balance adjustment of the bridge circuit 1 can be achieved with no offset voltage present. As a result, the set temperature value $\Delta T$ can be rendered stable to ensure the stability of the sensor output, thus achieving the measurement of the fluid with high accuracy.

Now, a fourth preferred embodiment of the present invention will be described hereinbelow. In the fourth preferred embodiment, the same or like elements are represented by the same reference signs as those used in the foregoing preferred embodiments so as to omit explanation thereof.

In this embodiment, a flow velocity measuring circuit includes a timing generator (not shown, see power supply section 24 of FIG. 9 referred to later) as a switching timing control unit for controlling timings of switching between the adjustment of the offset voltage of the operational amplifier 2, the balance adjustment of the bridge circuit 1 and the measurement of the fluid. Hereinbelow, a procedure of switching using the switching timing control unit will be described (see FIGS. 1 to 3).

(A) State of Circuit OFF (all the switches opened) →Switching to Offset Voltage Adjustment
  (1) Set the switch SW1 to the O side.
  (2) Close the switch SW2 to connect the offset voltage adjusting amplifier 6.

(B) Offset Voltage Adjustment→Switching to Bridge Circuit Adjustment
  (1) Open the switch SW2 to disconnect the offset voltage adjusting amplifier 6.
  (2) Set the switch SW1 to the B side and close the switch SW5.
  (3) Close the switch SW3 to connect the bridge circuit adjusting amplifier 5.

(C) Bridge Circuit Adjustment→Switching to Measurement
  (1) Open the switch SW3 to disconnect the bridge circuit adjusting amplifier 5.
  (2) Open the switch SW5.
  (3) Close the switch SW4 to connect the heating element Rh.

As appreciated from the foregoing switching procedure, by providing the timing generator, a possibility of causing, for example, such an error can be prevented that the switch SW1 is switched to the B side prior to opening the switch SW2 upon transition from the offset voltage adjustment to the bridge circuit adjustment so that a wrong control voltage Vo is held at the offset voltage adjusting amplifier 6 to adversely affect the accuracy of the flow velocity measurement. Thus, by controlling the switching timings of the switches delicately as described above, a wrong signal is prevented from being entrapped during the offset voltage adjustment and the bridge circuit adjustment, so as to improve the adjustment accuracy.

Figure 4:
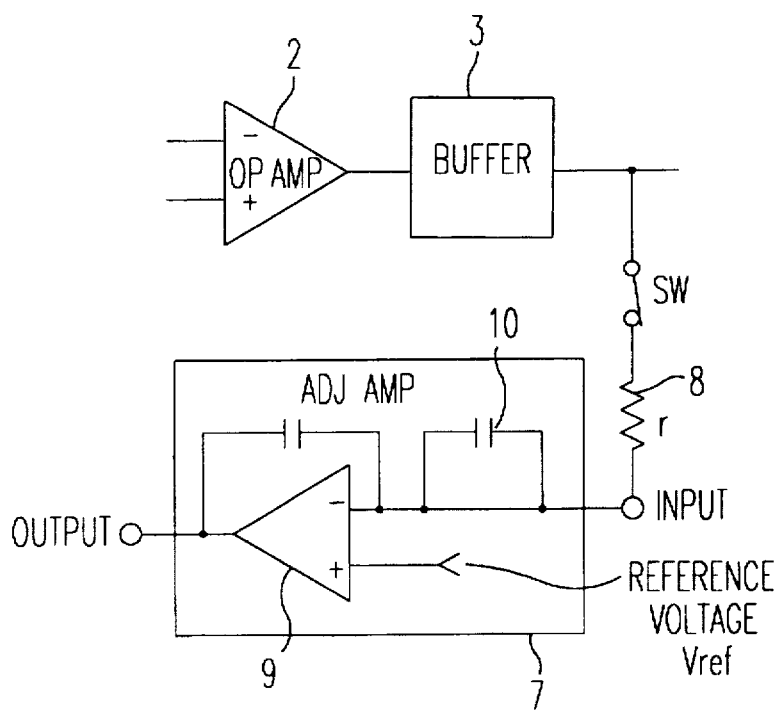
FIG. 4 is a diagram showing a flow velocity measuring circuit provided with a protective resistor in a thermo-sensitive flow velocity sensor according to a fifth preferred embodiment of the present invention.

Now, a fifth preferred embodiment of the present invention will be described hereinbelow with reference to FIG. 4. In the fifth preferred embodiment, the same or like elements are represented by the same reference signs as those used in the foregoing preferred embodiments so as to omit explanation thereof.

Between an output side of a buffer 3 and an adjusting amplifier 7 (adjusting unit) for an offset voltage of an operational amplifier 2 and for a bridge circuit 1 is connected a protective resistor 8 (r). In the adjusting amplifier 7, a capacitor 10 for phase compensation and a resistor 11 are connected in parallel at an inverted input side of an operational amplifier 9. The capacitor 10 is used for holding a control voltage so that the capacitor 10 preferably has a large capacitance.

When a switch SW is closed to switch into an adjusting mode, a capacitive load is applied to the buffer 3. Since this load is very large, it is possible that an abnormal circuit operation results. However, since the protective resistor 8 is interposed between the buffer 3 and the adjusting amplifier 7, the large load, which would be otherwise applied to the buffer 3 upon closing the switch SW, can be lightened so that the abnormal circuit operation can be prevented. It may be arranged that the protective resistor 8 is connected between an output side of the operational amplifier 2 and the adjusting amplifier 7.

Now, a sixth preferred embodiment of the present invention will be described hereinbelow with reference to FIGS. 5A and 5B. In the sixth preferred embodiment, the same or like elements are represented by the same reference signs as those used in the foregoing preferred embodiments so as to omit explanation thereof.

As shown in FIG. 5A, a virtual load resistor 12 (Rv) having a resistance approximate to that of a heating element Rh is connected at an output side of an amplifying circuit 13 (buffer 3). This virtual load resistor 12 is connected only during the offset voltage adjustment of an operational amplifier 2 and the balance adjustment of a bridge circuit 1, while virtual load resistor 12 is disconnected during the measurement of the flow velocity. The bridge circuit 1, the operational amplifier 2 and the buffer 3 are included in the amplifying circuit 13 and are hereby represented by an output voltage E and an output resistance Ro.

FIG. 5B shows a general amplifying circuit 13 having an output voltage E and an output resistance Ro, and further having a load resistance R connected to buffer output terminals thereof. Since the load resistance R is not connected during the offset voltage adjustment and the bridge circuit adjustment, an open-circuit voltage E appears across the buffer 3 output terminals. On the other hand, when the load resistance R is connected during the measurement, an output voltage (=E·R/(Ro+R)) appears across the buffer 3 output terminals. Accordingly, the voltages appearing at the buffer 3 output terminals during the adjustment and the measurement differ from each other due to the load matching not achieved so that adjustment points during the adjustment and the measurement slightly differ from each other.

On the other hand, in this embodiment, as shown in FIG. 5A, the virtual load resistor 12 having the resistance approximate to that of the heating element Rh is connected during the adjustment, so as to perform the offset voltage adjustment and the bridge circuit balance adjustment, and thereafter, the virtual load resistor 12 is disconnected and the heating element Rh is connected during the measurement. Accordingly, the load matching during the adjustment and the measurement can be achieved to further improve the measurement accuracy.

Now, a seventh preferred embodiment of the present invention will be described hereinbelow with reference to FIGS. 6 and 7. In the seventh preferred embodiment, the same or like elements are represented by the same reference signs as those used in the foregoing preferred embodiments so as to omit explanation thereof.

As shown in FIG. 6, a common-emitter circuit 14 including an npn transistor and having a resistance approximate to that of a heating element Rh is connected at an output side of an amplifying circuit 13 (buffer 3). As in the foregoing sixth preferred embodiment, the common-emitter circuit 14 is connected during the offset voltage adjustment and the bridge circuit adjustment for achieving the load matching.

Specifically, the common-emitter circuit 14 is connected so as to turn off when an output value of a buffer 3 (or an operational amplifier 2) is greater than a reference voltage Vref (see FIG. 3, for example), while turning on when the output value is around the reference voltage Vref, and a resistor R' having a proper resistance value is connected at a collector side thereof. With this arrangement, since the load matching is achieved when the output value of the buffer 3 is around the reference voltage Vref, the adjustment can be performed with high accuracy, and further, since the circuit current can be curtailed when the output value is high, the power consumption during the adjustment can be reduced.

FIG. 7 shows a modification of the seventh preferred embodiment, wherein a common-source circuit 15 including an FET and having a resistance approximate to that of the heating element Rh is connected at the output side of the buffer 3 instead of the common-emitter circuit. Accordingly, also in this modification, the load matching can be achieved by connecting the common-source circuit 15 so as to turn on when the output value of the buffer 3 is around the reference voltage Vref. Thus, the adjustment with high accuracy and the reduction in power consumption can be realized.

Now, an eighth preferred embodiment of the present invention will be described hereinbelow with reference to FIG. 8. In the eighth preferred embodiment, the same or like elements are represented by the same reference signs as those used in the foregoing preferred embodiments so as to omit explanation thereof.

Figure 8:
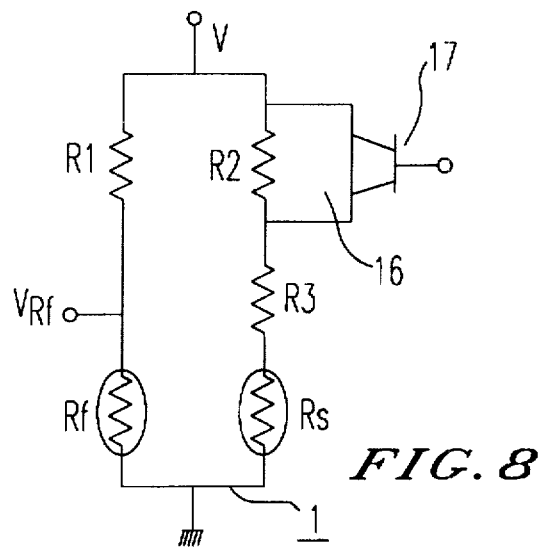
FIG. 8 is a diagram showing a flow velocity measuring circuit provided with a variable resistor at a side of a bridge circuit opposite to another side to which a fluid temperature detecting element is connected, in a thermo-sensitive flow velocity sensor according to an eighth preferred embodiment of the present invention.

In FIG. 8, a variable resistor 16 is connected to a side of a bridge circuit 1 opposite to the other side to which a fluid temperature detecting element Rf is connected. The variable resistor 16 includes a resistor R2 and a pnp transistor circuit 17 connected in parallel with the resistor R2. A control voltage Vb of a bridge circuit adjusting amplifier 5 (see FIG. 3, for example) is fed back to a base of the transistor circuit 17.

When performing a temperature correction of a sensor output, it is necessary to detect a fluid temperature. However, if, as in the foregoing background art of FIG. 19, the balance adjustment (fluid temperature setting resistor Rt) is performed at the side of the fluid temperature detecting element Rf, a voltage value applied to the fluid temperature detecting element Rf changes following the balance adjustment, so that a correct fluid temperature signal can not be obtained and thus a correct fluid temperature can not be detected. On the other hand, by adjusting the bridge circuit 1 using the variable resistor 16 connected to the side opposite to the side of the fluid temperature detecting element Rf, a voltage value VRf applied to the fluid temperature detecting element Rf is given by an equation (6) as follows:

$$VRf = \frac{Rf}{R1+Rf} \cdot V \tag{6}$$

From the equation (6), it is appreciated that the value of VRf is free of the balance adjustment of the bridge circuit 1. Since a value of R1 is known, a resistance value of Rf can be derived by reading in V and VRf. Thus, the correct fluid temperature signal can be obtained to detect the correct fluid output can be achieved with higher accuracy. Further, by using a known stabilized power supply for the voltage value V, the fluid temperature signal can be derived by reading in only the voltage value VRf so that the use of the input port can be saved.

Now, a practical circuit example will be described with reference to FIGS. 9 and 10.

Figure 9:
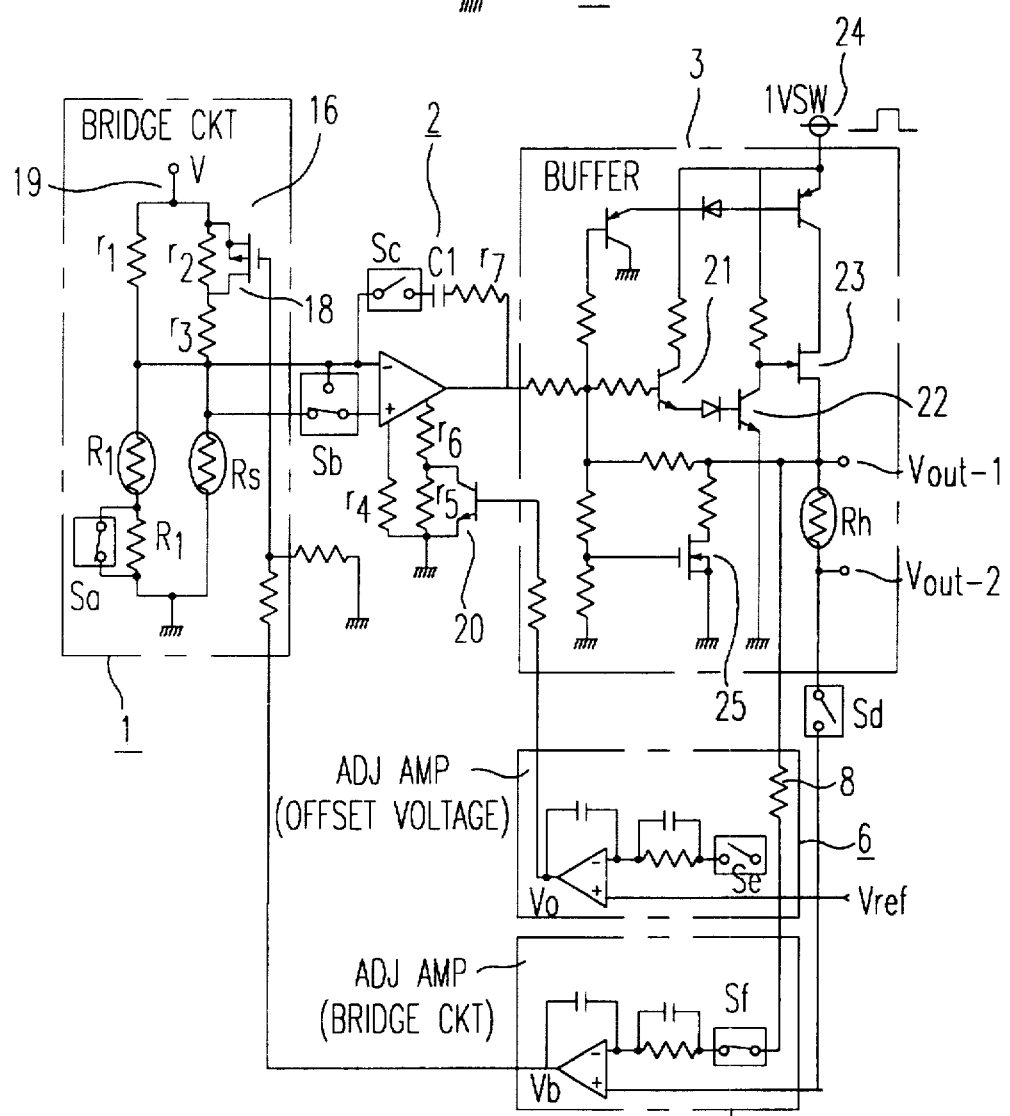
FIG. 9 is a diagram showing a practical example of a flow velocity measuring circuit with a bridge circuit adjusting function and an offset voltage adjusting function in a thermo-sensitive flow velocity sensor.

FIG. 9 shows a circuit example provided with an automatic adjusting function of an offset voltage of an operational amplifier 2 and an automatic adjusting function of a bridge circuit 1. The shown circuit includes a bridge circuit 1, an operational amplifier 2, a buffer 3, a bridge circuit adjusting amplifier 5 and an offset voltage adjusting amplifier 6. In the bridge circuit 1, $r_1$-$r_3$ denote fixed resistors, respectively. A MOSFET 18 connected to $r_2$ in parallel corresponds to the foregoing variable resistor 16 (see FIG. 8), and a drain-source resistance value is controlled depending on a gate voltage. To the gate of MOSFET 18 is applied a control voltage Vb from the bridge circuit adjusting amplifier 5. A power supply 19 is a stabilized power supply for detecting a precise fluid temperature signal. A switch Sa is connected to a temperature setting resistor Rt. The bridge circuit 1 is a circuit of an indirect-heated drive type which holds constant a temperature difference between a fluid temperature detecting element Rf and a heating-element temperature detecting element Rs.

In the operational amplifier 2, fixed resistors $r_4$-$r_6$ and an npn transistor 20 connected to $r_5$ in parallel are connected to zero-adjusting terminals of the operational amplifier 2. To a base of the transistor 20 is applied a control voltage Vo from the offset voltage adjusting amplifier 6. A switch Sb at an input side of the operational amplifier 2 is a circuit for switching between the adjustment and the measurement. Further, a switch Sc is provided for connecting or disconnecting an oscillation-preventing capacitor $C_1$ and a resistor $r_7$ and switch Sc is closed only during the measurement.

In the buffer 3, a gate of a junction-type FET 23 is connected to a collector side of npn transistors 21 and 22 which are connected in two stages (Darlington connection). The FET 23 is connected between the heating element Rh and the power supply section 24 which generates a voltage signal in a pulse waveform, and is used as a source follower. The power supply section 24 is a 2.5V intermittent-drive power supply and forms a switching timing control unit for switching the operation mode between the adjustment of the offset voltage of the operational amplifier 2, the balance adjustment of the bridge circuit 1 and the measurement of the fluid in this order while the circuit is on (see the foregoing fourth preferred embodiment). The heating element Rh is connected to the bridge circuit adjusting amplifier 5 via a switch Sd. Further, a MOSFET 25 forms a common-source circuit and achieves load matching and voltage lowering of the buffer 3. The output side of the buffer 3 is connected, via the protective resistor 8 (see FIG. 4), to a switch Se of the offset voltage adjusting amplifier 6 and a switch Sf of the bridge circuit adjusting amplifier 5. The buffer 3 achieves reduction in voltage magnitude of the drive circuit and a unilateral power supply thereof.

An output side of the bridge circuit adjusting amplifier 5 is connected to the MOSFET 18 forming the variable resistor of the bridge circuit 1. An output side of the offset voltage adjusting amplifier 6 is connected to the npn transistor 20 so that the closed loop control system is constituted.

Figure 10:
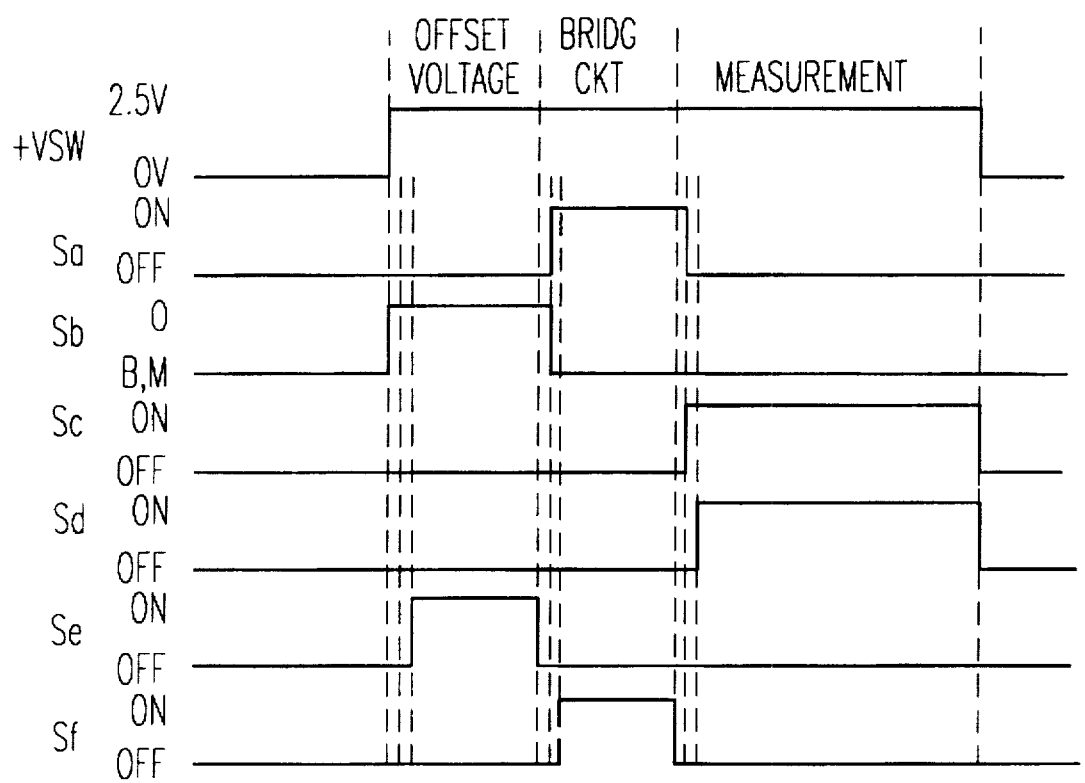
FIG. 10 is a timing chart showing a procedure for performing an offset voltage adjustment, a bridge circuit adjustment and fluid measurement in this order.

In the foregoing structure, the switches Sa-Sf in the circuit of FIG. 9 are switched according to a procedure identified by a timing chart shown in FIG. 10. Thus, the offset voltage adjustment, the bridge circuit adjustment and the measurement of the fluid are performed in the order named.

An experiment was performed using a thermo-sensitive flow velocity sensor having the flow velocity measuring circuit of FIG. 9 with the automatic adjusting functions of the offset voltage and the bridge circuit 1 (the offset voltage adjusting amplifier 6 and the bridge circuit adjusting amplifier 5) and a conventional thermo-sensitive flow velocity sensor having the flow velocity measuring circuit with no such automatic adjusting functions, so as to examine the stability of the sensor output values. In the experiment, both sensors have the same structure except for the flow velocity measuring circuits, and the same set temperature value ΔT was used. Further, in the experiment, the sensors and the gas flow path were held constant at 25° C. and the flow velocity measuring circuits were changed between 20°–40° C. so as to examine the flow velocity-output characteristics. The results of the experiment are as follows. In the conventional circuit, a difference between outputs at circuit temperatures of 20° C. and 40° C. relative to the same flow rate was 10–20 mV. On the other hand, in the circuit shown in FIG. 9, approximately no output difference was observed between outputs at these circuit temperatures, that is, an output difference was suppressed below a measurement limit value. Accordingly, in the present invention the sensor output can be stabilized to improve the measurement accuracy in the foregoing preferred embodiments as compared with the conventional art.

Now, a ninth preferred embodiment of the present invention will be described hereinbelow with reference to FIGS. 11 and 12. In the ninth preferred embodiment, the same or like elements are represented by the same reference signs as those used in FIGS. 20 and 21 so as to omit explanation thereof.

Figure 11:
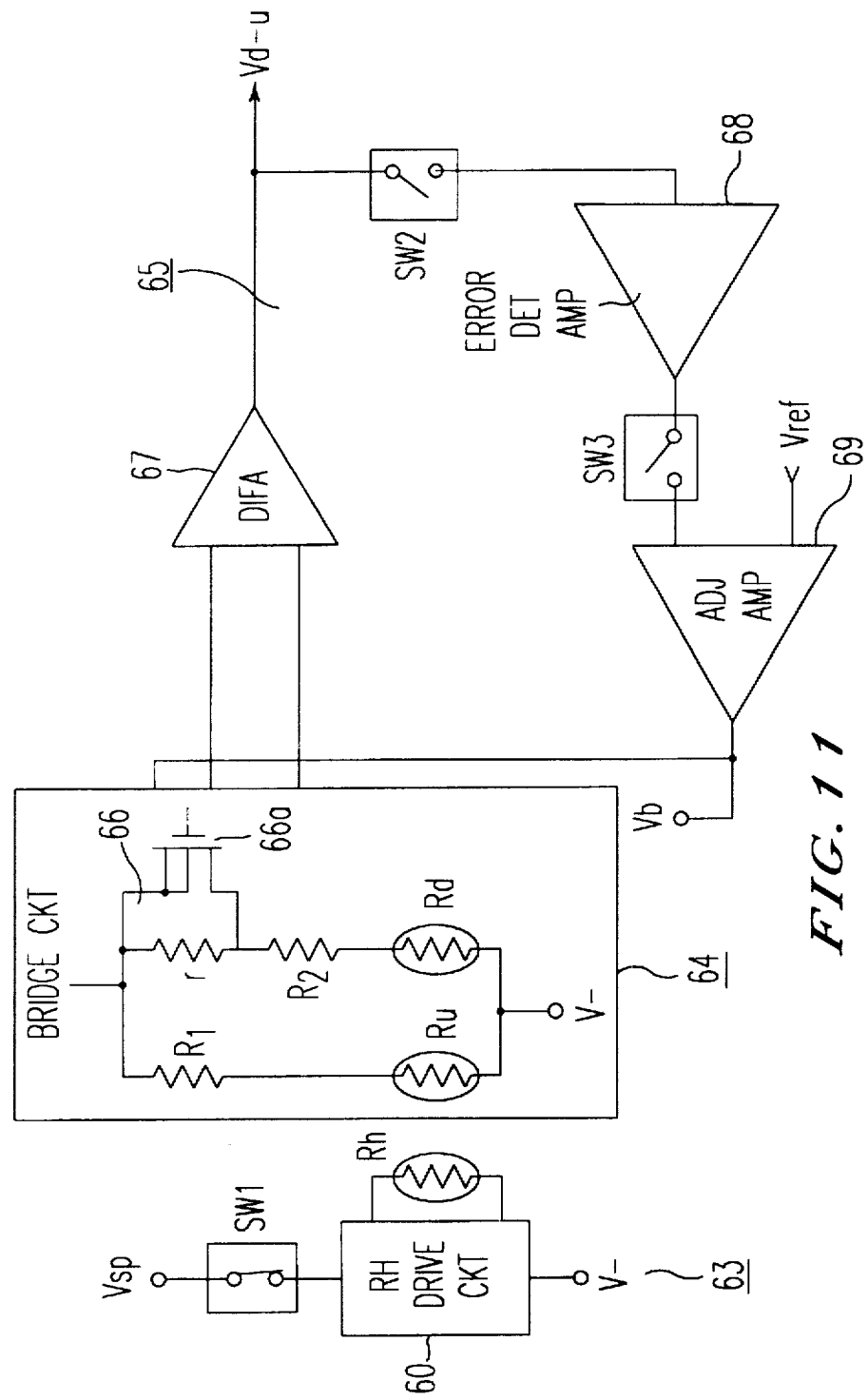
FIG. 11 is a diagram showing a flow velocity measuring circuit in a thermo-sensitive flow sensor according to a ninth preferred embodiment of the present invention.

FIG. 11 shows a flow velocity measuring circuit in a thermo-sensitive flow sensor according to the ninth preferred embodiment. As shown in FIG. 11, the flow velocity measuring circuit includes a heating-element drive section 63 for driving a heating element Rh, a temperature-difference detecting bridge circuit 64 and a bridge adjusting circuit 65 as bridge adjusting means. The heating-element drive section 63 includes a heating-element drive circuit 60 for driving the heating element Rh and a switch SW1 as a drive stopping unit. By opening the switch SW1, a supply of power Vsp to the heating element drive circuit 60 is stopped. In the temperature-difference detecting bridge circuit 64, a reference resistor R1 is connected to an upstream temperature detecting element Ru, and a reference resistor R2 and a voltage adjusting section 66 are connected to a downstream temperature detecting element Rd. The voltage adjusting section 66 is formed by a parallel circuit of a resistor r and a MOSFET 66a. The bridge adjusting circuit 65 includes a differential amplifier 67 for amplifying a potential difference between output terminals of the bridge circuit 64, a switch SW2, an error detecting amplifier 68, a switch SW3, a bridge circuit adjusting amplifier 69, and a switching timing control unit in the form of a command from a CPU (not shown) for controlling switching timings of SW1, SW2 and SW3 prior to measurement of the fluid.

In the foregoing structure, a balance adjustment of the bridge circuit 64 will be described hereinbelow.

During this circuit adjustment, SW1 is opened to stop the power supply to the heating element Rh, while SW2 and SW3 are closed, respectively. Accordingly, the closed loop control system is constituted by a forward transfer route including the bridge circuit 64 and the differential amplifier 67 and a feedback route including the error detecting amplifier 68 and the bridge circuit adjusting amplifier 69. As a result, the bridge circuit adjusting amplifier 69 outputs a control voltage Vb to the MOSFET 66a of the bridge circuit 64 so that the balance adjustment of the bridge circuit 64 is performed based on the control voltage Vb. This balance adjustment is continued until an output of the differential amplifier 67 becomes equal to a reference voltage Vref. In this manner, the bridge circuit 64 is automatically balanced or equilibrated.

After the bridge circuit 64 is balanced, SW2 and SW3 in the bridge adjusting circuit 65 are opened, while SW1 is closed to feed the power to the heating element Rh for driving the sensor to perform the measurement of the flow rate. During the measurement, the bridge adjusting circuit 65 is disconnected from the bridge circuit 64. However, since the bridge circuit adjusting amplifier 69 holds the control voltage Vb, the bridge circuit 64 is held in the adjusted state even during the measurement.

Now, the switching timing control for controlling switching timings of SW1, SW2 and SW3 will be explained. For example, if SW2 and SW3 are opened after closing SW1 upon transition from the bridge circuit adjustment to the measurement of the flow rate, a wrong voltage signal is held at the bridge circuit adjusting amplifier 69 to adversely affect the accuracy of the flow rate measurement. In view of this, the switching of SW1, SW2 and SW3 is performed according to the following procedure:

(A) Bridge Circuit Adjustment→Switching to Measurement
 (1) Open the switch SW3.
 (2) Open the switch SW2 and close the switch SW1 to supply the power to the heating element Rh.
(B) Measurement→Switching to Bridge Circuit Adjustment
 (1) Open the switch SW1 to stop the power supply to the heating element Rh and close the switch SW2.
 (2) Close the switch SW3.

Figure 12:
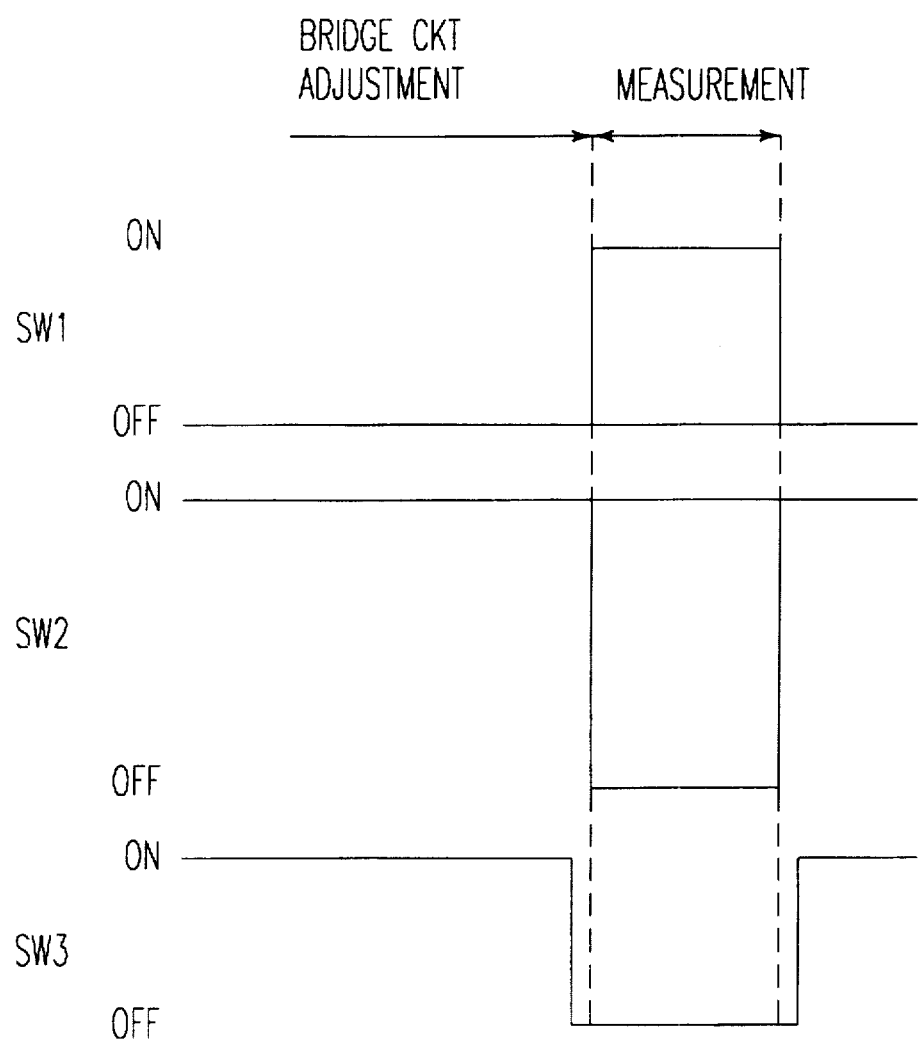
FIG. 12 is a timing chart showing a switching procedure for switches.

FIG. 12 shows the operation timings of SW1, SW2 and SW3. By controlling the switching timing from the bridge circuit adjustment to the measurement and the switching timing from the measurement to the bridge circuit adjustment, the wrong signal is prevented from being entrapped during the bridge circuit adjustment so that the measurement accuracy can be improved. Accordingly, even when time dependent variations are generated for the respective resistors in the bridge circuit 64, since the bridge circuit is balanced before starting the measurement, the measurement of the flow velocity can be achieved with high accuracy so that the stabilization of the sensor output can be realized.

Now, a tenth preferred embodiment of the present invention will be described hereinbelow with reference to FIGS. 13 and 14. In the tenth preferred embodiment, the same or like elements are represented by the same reference signs as those used in the foregoing ninth preferred embodiment so as to omit explanation thereof.

In this embodiment, a flow velocity measuring circuit is further provided with an offset voltage adjusting function for a differential amplifier 67 as compared with the flow velocity measuring circuit of the ninth preferred embodiment. Specifically, as shown in FIG. 13, a switch SW4 as a short-circuiting unit is connected between a temperature-difference detecting bridge circuit 64 and the differential amplifier 67. The differential amplifier 67 is provided with a zero-adjusting circuit 70 as a zero-adjusting unit in the form of a closed loop. The zero-adjusting circuit 70 includes a switch SW5, an error detecting amplifier 71, a switch SW6 and a differential-amplifier adjusting amplifier 72.

Now, an operation of the circuit shown in FIG. 13 will be described. First, during a differential amplifier adjustment, SW1 is opened and SW4 is switched from an M side to an O side for short-circuiting input terminals of the differential amplifier 67. Further, SW5 and SW6 are closed, and SW2 and SW3 are opened so that an output voltage of the differential amplifier 67 is adjusted to be equal to a reference voltage Vref. In this manner, an offset voltage of the differential amplifier 67 is adjusted to be zero.

Thereafter, the bridge circuit adjustment and the measurement are performed in turn. Specifically, during the bridge circuit adjustment, SW1 is opened, SW4 is switched to the M side, SW5 and SW6 are opened, and SW2 and SW3 are closed so that the bridge adjustment is performed. Then, during the measurement of the flow rate, SW1 is closed, SW4 is held to the M side, and SW2, SW3, SW5 and SW6 are opened in the state where the offset voltage adjustment of the differential amplifier 67 and the balance adjustment of the bridge circuit 64 are achieved. During the flow rate measurement, the zero-adjusting circuit 70 and the bridge adjusting circuit 65 are disconnected from the bridge circuit 64. However, since the control voltage Vd of the differential-amplifier adjusting amplifier 72 and the control voltage Vb of the bridge circuit adjusting amplifier 69 are held due to the holding function, the measurement of the flow rate can be performed in the state where the offset adjustment of the differential amplifier 67 and the bridge adjustment of the bridge circuit 64 are held.

As described above, since the balance adjustment of the bridge circuit 64 is performed after completion of the offset voltage adjustment, the bridge circuit 64 can be adjusted with no offset voltage present so that the measurement accuracy can be highly enhanced. Further, since the switching of SW1–SW6 is performed according to the timings shown in FIG. 14, no wrong voltage signal is entrapped, to thereby further enhance the measurement accuracy.

Figure 15:
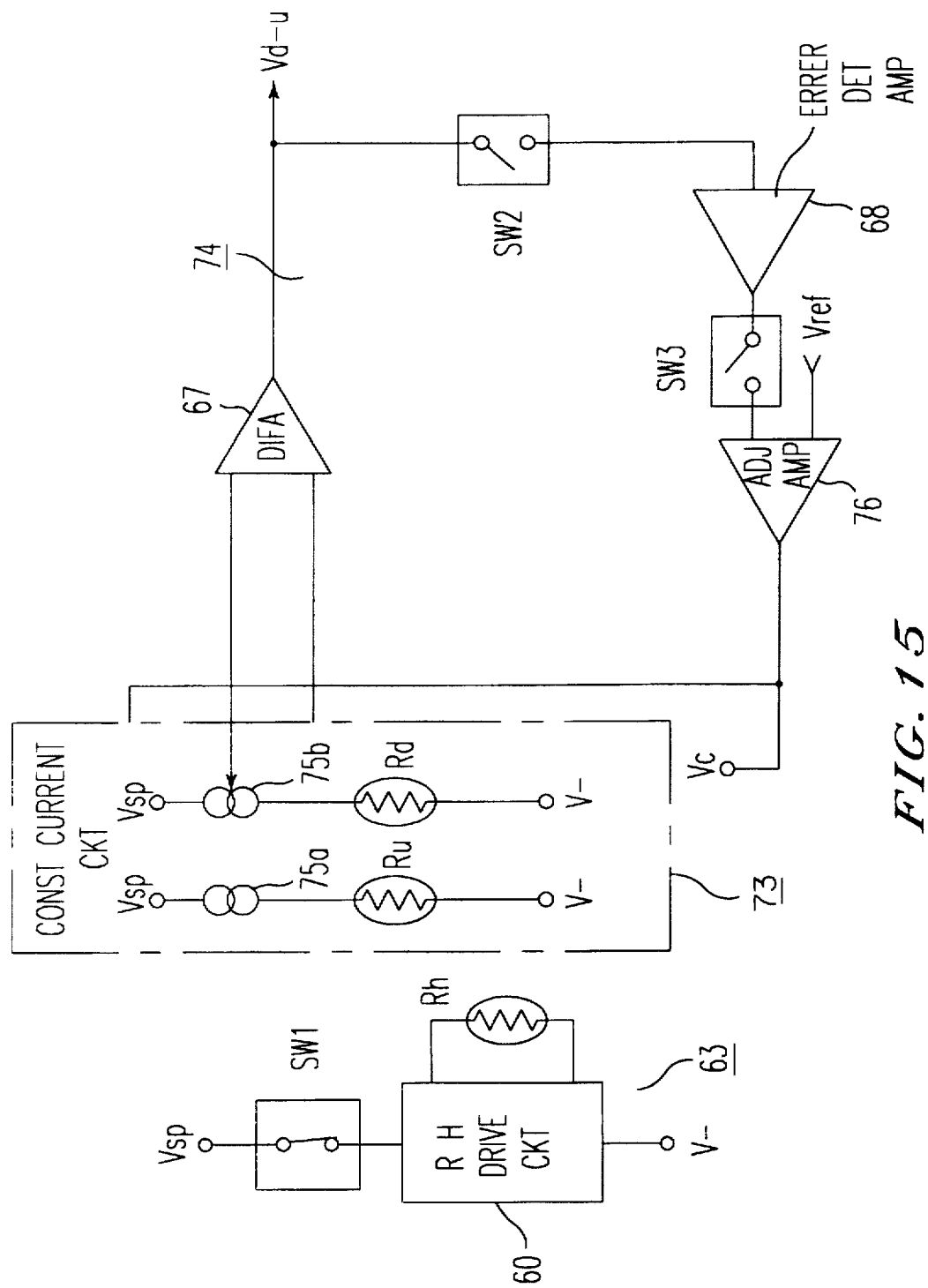
FIG. 15 is a diagram showing a flow velocity measuring circuit in a thermo-sensitive flow sensor according to an eleventh preferred embodiment of the present invention.

Now, an eleventh preferred embodiment of the present invention will be described hereinbelow with reference to FIGS. 15 and 16. In the eleventh preferred embodiment, the same or like elements are represented by the same reference signs as those used in the foregoing ninth and tenth preferred embodiments so as to omit explanation thereof.

In this embodiment, a temperature-difference detecting constant current circuit 73 is provided instead of the temperature-difference detecting bridge circuit 64. Accordingly, as shown in FIG. 15, a flow velocity measuring circuit in this embodiment includes a heating-element drive section 63 for driving a heating element Rh, the constant current circuit 73 and a constant current adjusting circuit 74 as a constant current adjusting unit. In the constant current circuit 73, a current source 75a is connected to an upstream temperature detecting element Ru and a current source 75b is connected to a downstream temperature detecting element Rd. The constant current adjusting circuit 74 includes a differential amplifier 67 for amplifying a potential difference between output terminals of the constant current circuit 73, a switch SW2, an error detecting amplifier 68, a switch SW3, a constant current circuit adjusting amplifier 76, and a switching timing control unit in the form of a command from a CPU (not shown) for controlling switching timings of SW1, SW2 and SW3 prior to measurement of the fluid.

In the foregoing structure, an adjustment of the constant current circuit 73 will be described hereinbelow.

During this circuit adjustment, SW1 is opened to stop the power supply to the heating element Rh, while SW2 and SW3 are closed, respectively. Accordingly, the closed loop control system is constituted by a forward transfer route including the constant current circuit 73 and the differential amplifier 67 and a feedback route including the error detecting amplifier 68 and the constant current circuit adjusting amplifier 76. With this arrangement, the constant current circuit adjusting amplifier 76 outputs a control voltage Vc to the constant current circuit 73. Based on the control voltage Vc, a difference between voltages across the upstream temperature detecting element Ru and the downstream temperature detecting element Rd is adjusted to zero. This adjustment is continued until an output of the differential amplifier 67 becomes equal to a reference voltage Vref. In this manner, the automatic adjustment of the upstream and downstream temperature detecting elements Ru and Rd is performed.

In the state where the voltages across the upstream and downstream temperature detecting elements Ru and Rd are rendered equal to each other, SW2 and SW3 in the constant current adjusting circuit 74 are opened, while SW1 is closed to feed the power to the heating element Rh for driving the sensor to perform the measurement of the flow rate. During the measurement, the constant current adjusting circuit 74 is disconnected from the constant current circuit 73. However, since the constant current circuit adjusting amplifier 76 holds the control voltage Vc, the state of the voltages across the upstream and downstream temperature detecting elements Ru and Rd being equal to each other is held even during the measurement. Also in this embodiment, by performing the switching of SW1, SW2 and SW3 according to the timing procedure as shown in FIG. 12, the stabilization of the sensor output can be achieved.

Figure 16:
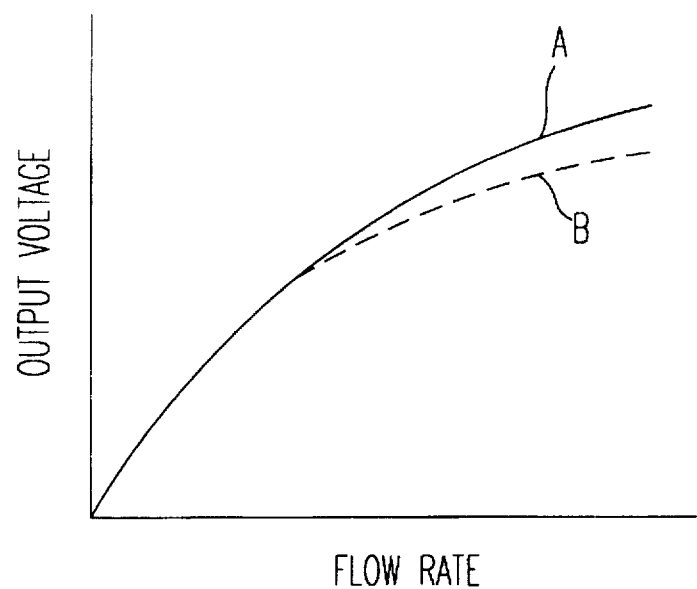
FIG. 16 is a characteristic diagram showing an output voltage waveform A of a temperature-difference detecting constant current circuit and an output voltage waveform B of a temperature-difference detecting bridge circuit relative to a flow rate variation.

FIG. 16 shows an output voltage waveform A of the constant current circuit 73 and an output voltage waveform B of the bridge circuit 64 relative to a flow rate variation. The reason why the waveform A is not liable to be saturated as compared with the waveform B is that even when resistance values of the upstream and downstream temperature detecting elements Ru and Rd increase due to heat radiation from the heating element Rh, the currents flowing through the temperature detecting elements Ru and Rd are not reduced so that an output voltage variation relative to a resistance value variation is increased. Thus, in this embodiment, the measurement of the flow rate can be achieved over a greater range.

Figure 17:
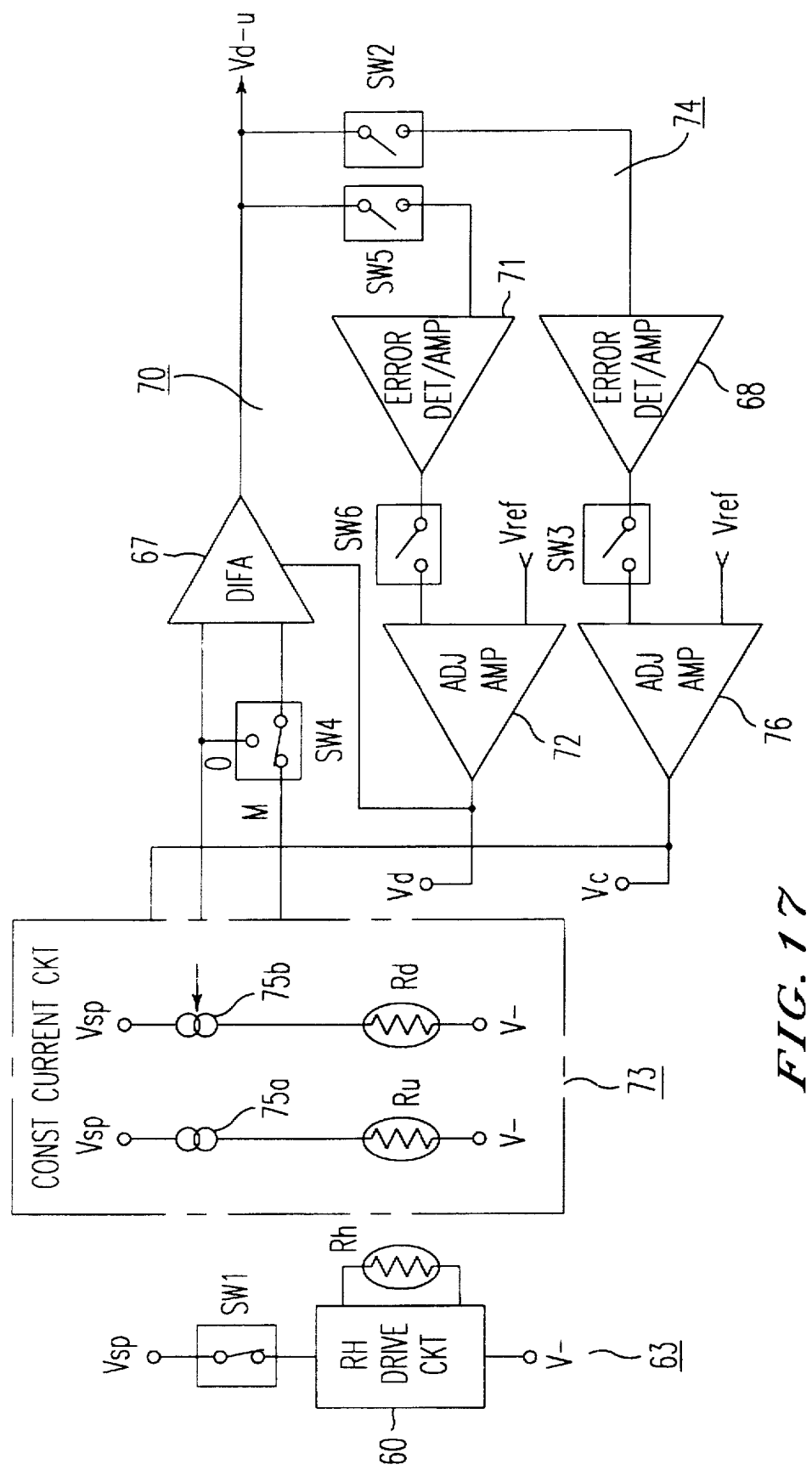
FIG. 17 is a diagram showing a flow velocity measuring circuit in a thermo-sensitive flow sensor according to a twelfth preferred embodiment of the present invention.

Now, a twelfth preferred embodiment of the present invention will be described hereinbelow with reference to FIG. 17. In the twelfth preferred embodiment, the same or like elements are represented by the same reference signs as those used in the foregoing ninth to eleventh preferred embodiments so as to omit explanation thereof.

In this embodiment, a flow velocity measuring circuit is further provided with an offset voltage adjusting function for a differential amplifier 67 as compared with the flow velocity measuring circuit of the eleventh preferred embodiment. Specifically, as shown in FIG. 17, a switch SW4 as a short-circuiting unit is connected between a temperature-difference detecting constant current circuit 73 and the differential amplifier 67. The differential amplifier 67 is provided with a zero-adjusting circuit 70 as a zero-adjusting unit in the form of a closed loop. The zero-adjusting circuit 70 includes a switch SW5, an error detecting amplifier 71, a switch SW6 and a differential-amplifier adjusting amplifier 72.

Now, an operation of the circuit shown in FIG. 17 will be described. First, during the differential amplifier adjustment, SW1 is opened and SW4 is switched from an M side to an O side for short-circuiting input terminals of the differential amplifier 67. Further, SW5 and SW6 are closed and SW2 and SW3 are opened so that an output voltage of the differential amplifier 67 is adjusted to be equal to a reference voltage Vref. In this manner, an offset voltage of the differential amplifier 67 is adjusted to be zero.

Thereafter, the constant current circuit adjustment and the measurement are performed in turn. Specifically, during the constant current circuit adjustment, SW1 is opened, SW4 is switched to the M side, SW5 and SW6 are opened, and SW2 and SW3 are closed so that the automatic adjustment is performed to render the voltages across the upstream and downstream temperature detecting elements Ru and Rd equal to each other. Then, during the measurement of the flow rate, SW1 is closed, SW4 is held to the M side, and SW2, SW3, SW5 and SW6 are opened in the state where the offset voltage adjustment of the differential amplifier 67 and the adjustment of the constant current circuit 73 are achieved. During the flow rate measurement, the zero-adjusting circuit 70 and the constant current adjusting circuit 74 are disconnected from the constant current circuit 73. However, since the control voltage Vd of the differential-amplifier adjusting amplifier 72 and the control voltage Vc of the constant current circuit adjusting amplifier 76 are held due to the holding function, the measurement of the flow rate can be performed in the state where the offset adjustment of the differential amplifier 67 and the adjustment of the constant current circuit 73 are held.

As described above, since the adjustment of the constant current circuit 73 is performed after completion of the offset voltage adjustment, the constant current circuit 73 can be adjusted with no offset voltage present so that the measurement accuracy can be highly enhanced. Further, since the switching of SW1–SW6 is performed according to timings shown in FIG. 14, no wrong voltage signal is entrapped, to thereby further enhance the measurement accuracy.

Figure 20:
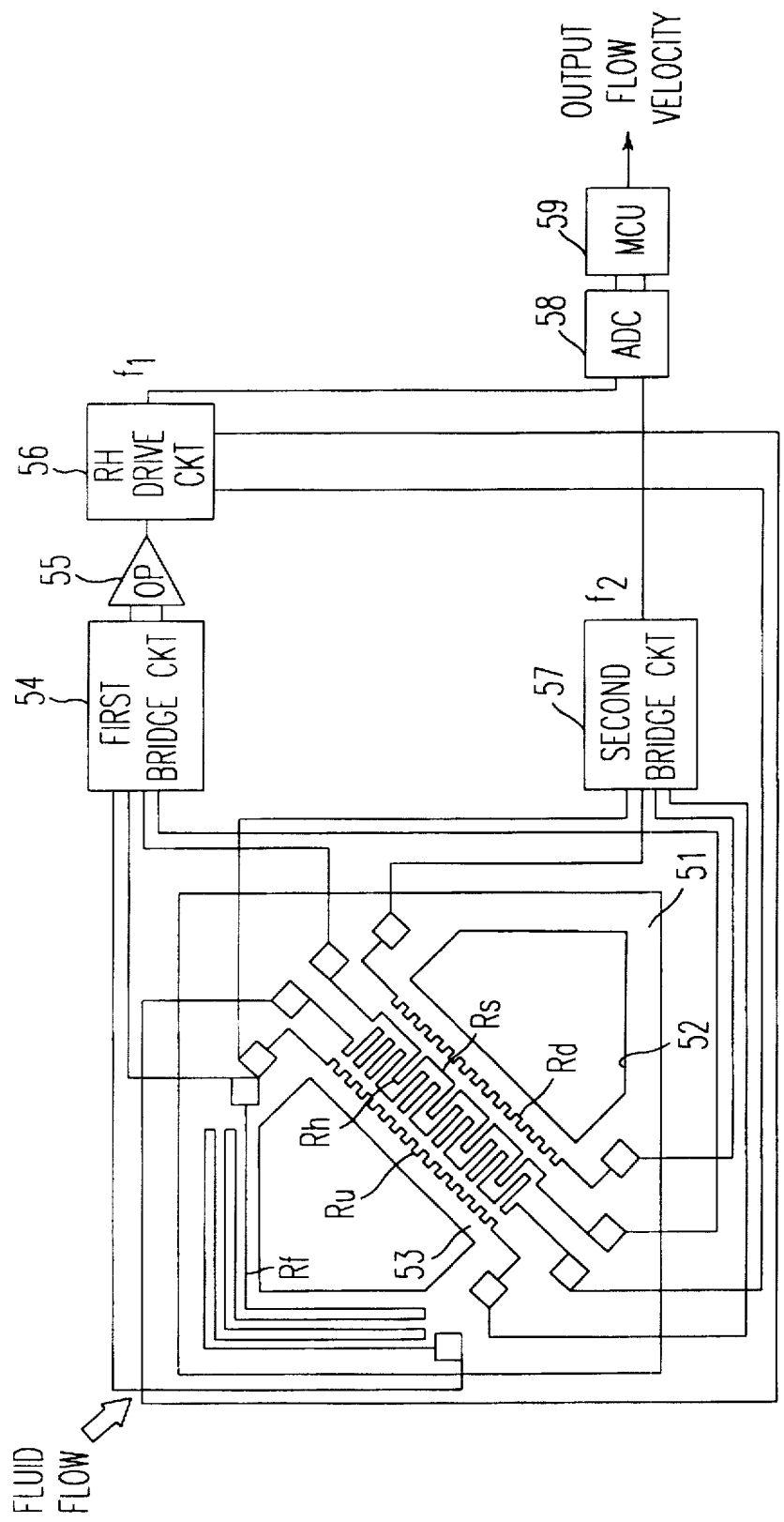
FIG. 20 is a diagram showing a structure of a background thermo-sensitive flow sensor.
Figure 21:
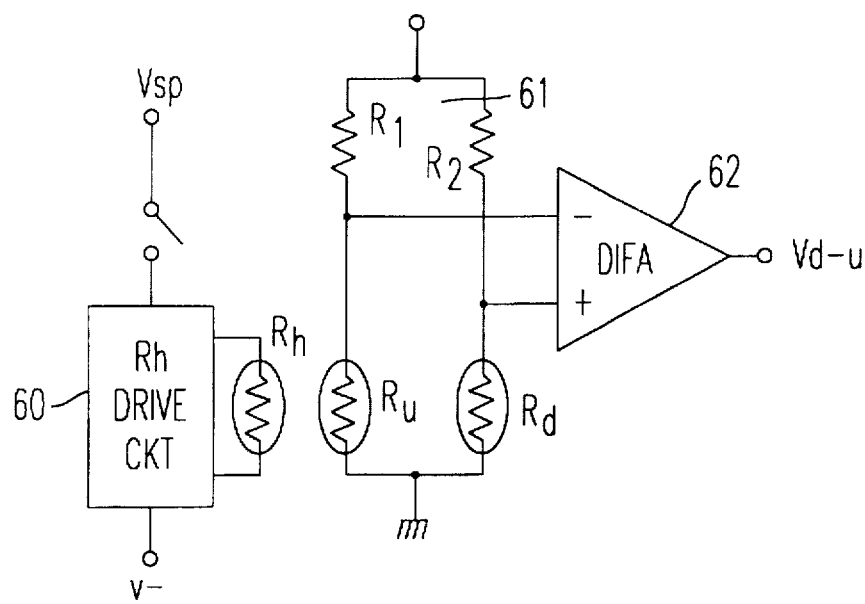
FIG. 21 is a diagram showing a structure of another background thermo-sensitive flow sensor.
Figure 22:
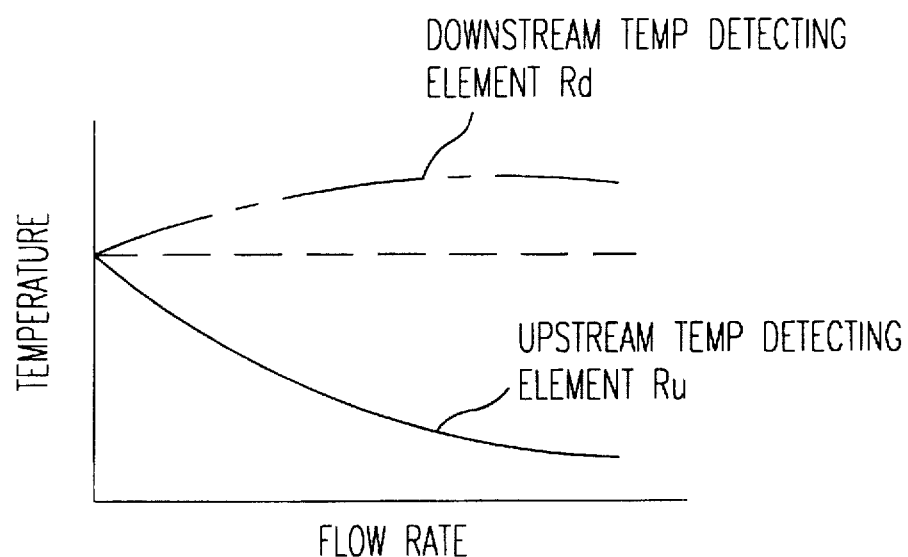
FIG. 22 is a characteristic diagram showing temperature variations of upstream and downstream temperature detecting elements of the background thermo-sensitive flow sensor shown in FIG. 21 relative to gas flow rates.

As appreciated, the thermo-sensitive flow sensor shown in FIG. 20 is of an indirect-heated drive type which holds constant a temperature difference between the fluid temperature detecting element Rf and the heating-element temperature detecting element Rs. The indirect-heated drive type has the following advantages over a direct-heated drive type which holds constant a temperature difference between the fluid temperature detecting element Rf and the heating element Rh:

(1) The utilization efficiency of the power supply is high, and the degree of freedom for the circuit structure is large;
(2) The self-heating of the fluid temperature detecting element Rf can be highly suppressed; and
(3) In general, an energization quantity of the heating element Rh is large, and thus a time-dependent variation thereof is also large.

Accordingly, in the direct-heated drive type, a time-dependent variation of the set temperature value becomes large. On the other hand, in the indirect-heated drive type, since the heating-element temperature detecting element Rs having a small energization quantity is used, a variation of the set temperature value is small.

Figure 13:
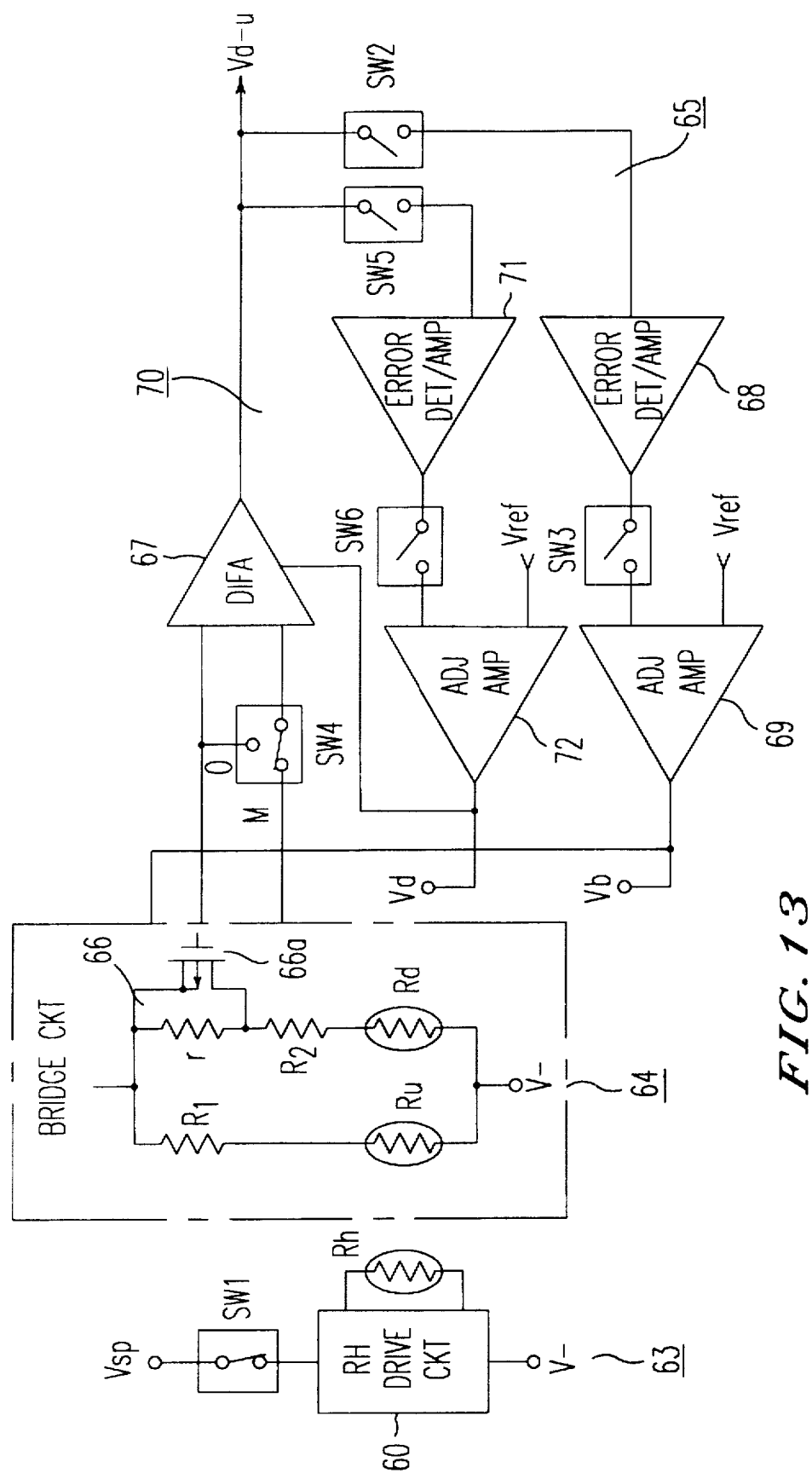
FIG. 13 is a diagram showing a flow velocity measuring circuit in a thermo-sensitive flow sensor according to a tenth preferred embodiment of the present invention.
Figure 14:
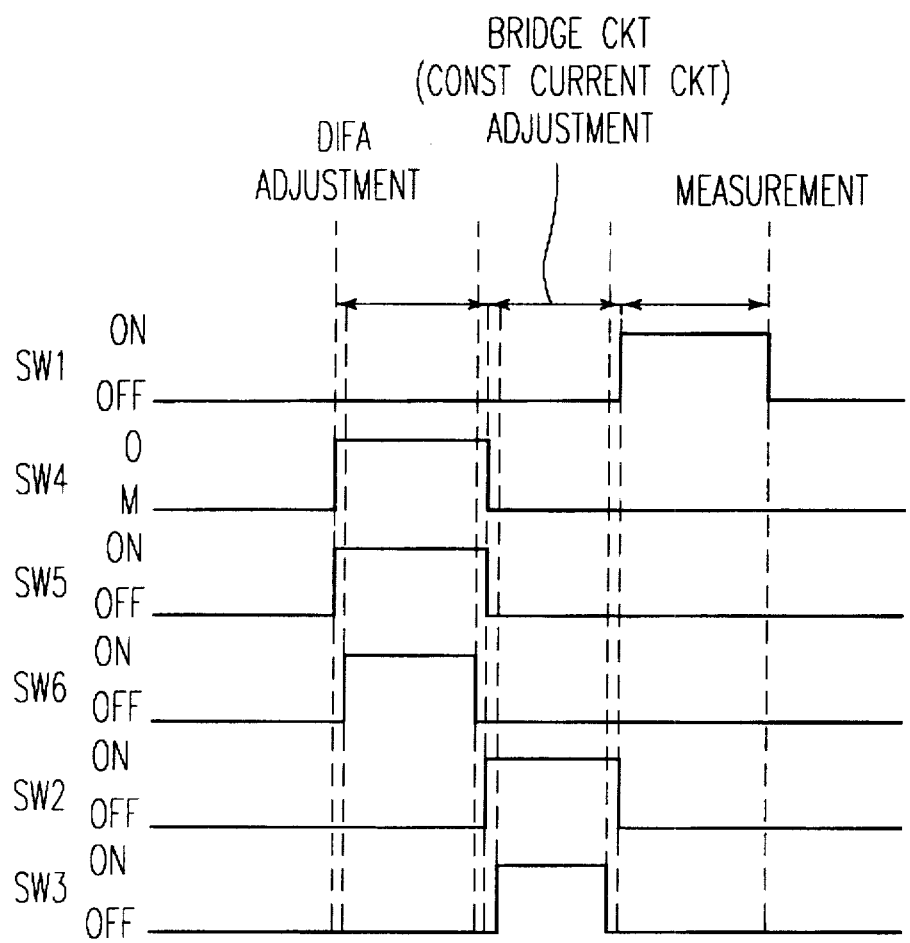
FIG. 14 is a timing chart showing a switching procedure for switches.

The circuit, for example, shown in FIG. 13 may be applied to the thermo-sensitive flow sensor of FIG. 20. In this case, the upstream and downstream temperature detecting elements Ru and Rd in FIG. 20 are applied within the bridge circuit 64 in FIG. 13. With this arrangement, the thermo-sensitive flow sensor having a stable output and a small time-dependent variation of the set temperature value can be achieved.

Now, a detailed structure of the thermo-sensitive flow sensor will be explained with reference to FIG. 18 which essentially corresponds to the circuit shown in FIG. 13. In a heating-element drive circuit 60 of a heating-element drive section 63, a bridge circuit 77 of an indirect-heated drive type having a fluid temperature detecting element Rf, a heating-element temperature detecting element Rs and fixed resistors $r_1$, $r_2$ and $r_3$ are provided. A potential difference between terminals of the bridge circuit 77 is amplified by an operational amplifier 78, and the power is fed to a heating element Rh via a buffer circuit 79. A p-channel MOSFET 66a of a temperature-difference detecting bridge circuit 64 is used as a variable resistor whose drain-source resistance value is controlled by a gate voltage. A differential amplifier 67 includes three operational amplifiers 80a, 80b and 80c, having a high input impedance. An output side of the differential amplifier 67 is connected to error detecting amplifiers 68 and 71 via switches SW2 and SW5, respectively. A capacitor 81 of a bridge circuit adjusting amplifier 69 holds a control voltage Vb, while a capacitor 82 of a differential-amplifier adjusting amplifier 72 holds a control voltage Vd.

The output of the bridge circuit adjusting amplifier 69 is connected to the MOSFET 66a of the bridge circuit 64, while the output of the differential-amplifier adjusting amplifier 72 is connected to a non-inverted terminal P at an output stage of the differential amplifier 67. With this arrangement, the closed loop control system is constituted by the error detecting amplifier 68 connected to an output stage of the differential amplifier 67 and the bridge circuit adjusting amplifier 69, and further, the closed loop control system is constituted by the error detecting amplifier 71 connected to the output stage of the differential amplifier 67 and the differential-amplifier adjusting amplifier 72. The error detecting amplifiers 68 and 71 are important components for determining the measurement accuracy and are arranged to have large dc gains, respectively. With the foregoing structure, the offset voltage adjustment of the differential amplifier 67, the balance adjustment of the bridge circuit 64 and the measurement of the flow rate can be achieved by switching SW1-SW6 according to the operation timings in the timing chart of FIG. 14.

Figure 18:
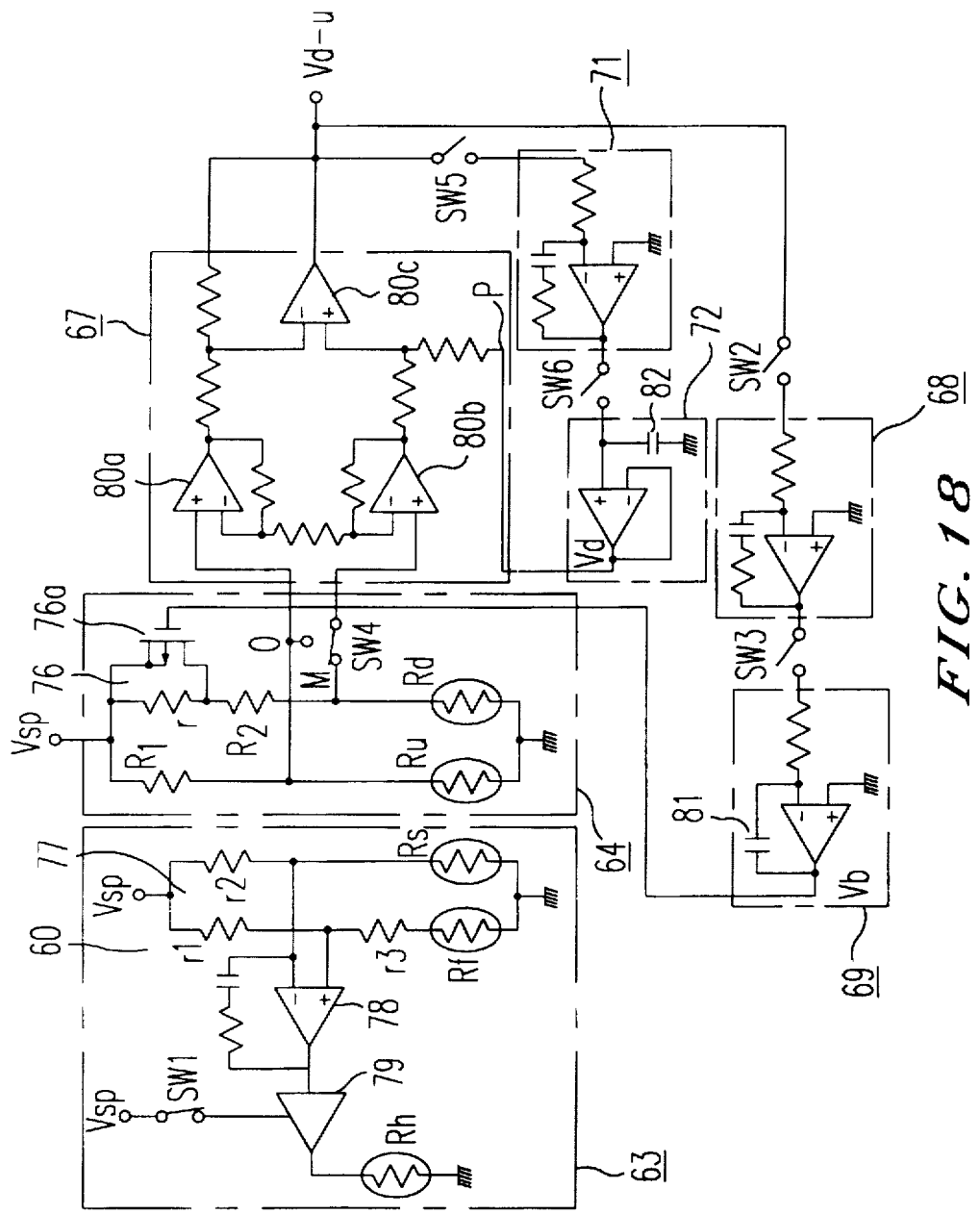
FIG. 18 is a diagram showing a detailed structure of a flow velocity measuring circuit which essentially corresponds to the circuit shown in FIG. 13.

An experiment was performed using a thermo-sensitive flow sensor having the flow velocity measuring circuit of FIG. 18 with the foregoing automatic adjusting functions and a conventional thermo-sensitive flow sensor having the flow velocity measuring circuit with no such automatic adjusting functions, so as to examine the stability of the sensor output values. In the experiment, both sensors have the same structure except for the flow velocity measuring circuits, and the same set temperature value ΔT was used. In the experiment, a dc gain of the differential amplifier 67 was set to 500 and the indirect-heated drive was used. Further, in the experiment, the sensors and the gas flow path were held constant at 25° C. and the flow velocity measuring circuits were kept in a natural condition so as to examine the flow rate-output characteristics ten times in ten days. The results of the experiment are as follows. In the conventional sensor, sensor outputs changed in a range of about ±50 mV relative to the flow rate being zero. On the other hand, in the sensor of FIG. 18, sensor outputs changed in a range of about ±5 mV relative to the flow rate being zero. Accordingly, the variation range of the sensor output was reduced by about ¹/₁₀ so that the stabilization of the sensor output was achieved.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A thermo-sensitive flow velocity sensor comprising:
   a heating element and a heating-element temperature detecting element provided on a beam formed by etching a substrate;
   a fluid temperature detecting element provided on said substrate near said beam for measuring a temperature of fluid;
   a sensor drive circuit connected to the heating element for receiving, via an amplifier, an output value from a bridge circuit, including said heating-element temperature detecting element, said fluid temperature detecting element and at least a temperature setting resistor, and wherein a flow velocity of the fluid is measured from radiant quantities of said heating element connected to said sensor drive circuit; and
   adjusting means provided at an output of said sensor drive circuit for providing an input to the bridge circuit which adjusts an output value of said bridge circuit by, in a balancing mode, forming a closed loop of the sensor drive circuit and adjusting means while short-circuiting the temperature setting resistor and disconnecting the heating element, and then reconnecting the heating element and temperature setting resistor.

2. The thermo-sensitive flow velocity sensor according to claim 1, further comprising a protective resistor connected between said sensor drive circuit and said adjusting means.

3. The thermo-sensitive flow velocity sensor according to claim 1, further comprising a virtual load resistor having a resistance value approximate to that of said heating element connected at the output of said sensor drive circuit.

4. The thermo-sensitive flow velocity sensor according to claim 1, further comprising a common-emitter circuit having a resistance value approximate to that of said heating element connected at the output of said sensor drive circuit.

5. The thermo-sensitive flow velocity sensor according to claim 1, further comprising a common-source circuit having a resistance value approximate to that of said heating element connected at the output of said sensor drive circuit.

6. The thermo-sensitive flow velocity sensor according to claim 1, further comprising a variable resistor connected to said bridge circuit at a side opposite to a side to which said fluid temperature detecting element is connected.

7. A thermo-sensitive flow velocity sensor comprising:
   a heating element and a heating-element temperature detecting element provided on a beam formed by etching a substrate;
   a fluid temperature detecting element provided on said substrate near said beam for measuring a temperature of fluid;
   a sensor drive circuit connected to said heating element for receiving, via an amplifier, an output value from a bridge circuit, including said heating-element temperature detecting element, said fluid temperature detecting element and at least a temperature detecting resistor, and wherein a flow velocity of the fluid is measured from radiant quantities of said heating element connected to said sensor drive circuit; and
   adjusting means provided at an output of said sensor drive circuit for providing an input to the bridge circuit which adjusts an offset voltage of said amplifying circuit by, in a balancing mode, forming a closed loop of the sensor drive circuit and adjusting means while short-circuiting the temperature setting resistor and disconnecting the heating element, and then reconnecting the heating element and temperature setting resistor.

8. The thermo-sensitive flow velocity sensor according to claim 7, further comprising a protective resistor connected between said sensor drive circuit and said adjusting means.

9. The thermo-sensitive flow velocity sensor according to claim 7, further comprising a virtual load resistor having a resistance value approximate to that of said heating element connected at the output of said sensor drive circuit.

10. The thermo-sensitive flow velocity sensor according to claim 7, further comprising a common-emitter circuit having a resistance value approximate to that of said heating element connected at the output of said sensor drive circuit.

11. The thermo-sensitive flow velocity sensor according to claim 7, further comprising a common-source circuit having a resistance value approximate to that of said heating element connected at the output of said sensor drive circuit.

12. A thermo-sensitive flow velocity sensor comprising:

a heating element and a heating-element temperature detecting element provided on a beam formed by etching a substrate;

a fluid temperature detecting element provided on said substrate near said beam for measuring a temperature of fluid;

a sensor drive circuit connected to said heating element for receiving, via an amplifier, an output value from a bridge circuit, including said heating-element temperature detecting element, said fluid temperature detecting element and at least a temperature setting resistor, and wherein a flow velocity of the fluid is measured from radiant quantities of said heating element connected to said sensor drive circuit;

first adjusting means provided at an output of said sensor drive circuit for adjusting an output value of said bridge circuit by, in a balancing mode, forming a closed loop of the sensor drive circuit and adjusting means while short-circuiting the temperature setting resistor and disconnecting the heating element, and then reconnecting the heating element and temperature setting resistor; and second adjusting means provided at the output of said sensor drive circuit for adjusting an offset voltage of said amplifying circuit by, in the balancing mode, forming the closed loop from the sensor drive circuit and adjusting means while short-circuiting the temperature setting resistor and disconnecting the heating element, and then reconnecting the heating element and temperature setting resistor.

13. A thermo-sensitive flow velocity sensor comprising:

a heating element and a heating-element temperature detecting element provided on a beam formed by etching a substrate;

a fluid temperature detecting element provided on said substrate near said beam for measuring a temperature of fluid;

a sensor drive circuit connected to said heating element for receiving, via an amplifier, an output value from a bridge circuit, including said heating-element temperature detecting element, said fluid temperature detecting element and resistors, and wherein a flow velocity of the fluid is measured from radiant quantities of said heating element connected to said sensor drive circuit;

first adjusting means provided at an output of said sensor drive circuit for providing an input to the bridge circuit which adjusts an output value of said bridge circuit;

second adjusting means provided at the output of said sensor drive circuit for providing an input to the bridge circuit which adjusts an offset voltage of said amplifying circuit; and switching means for switching between an adjustment of the offset voltage of said amplifying circuit, an adjustment of the output value of said bridge circuit and a measurement of the flow velocity.

14. A thermo-sensitive flow velocity sensor comprising:

a heating element and a heating-element temperature detecting element provided on a beam formed by etching a substrate;

a fluid temperature detecting element provided on said substrate near said beam for measuring a temperature of fluid;

a sensor drive circuit connected to said heating element for receiving, via an amplifier, an output value from a bridge circuit, including said heating-element temperature detecting element, said fluid temperature detecting element and resistors, and wherein a flow velocity of the fluid is measured from radiant quantities of said heating element connected to said sensor drive circuit;

first adjusting means provided at an output of said sensor drive circuit for providing an input to the bridge circuit which adjusts an output value of said bridge circuit;

second adjusting means provided at the output of said sensor drive circuit for adjusting an offset voltage of said amplifying circuit; and switching timing control means for controlling timings of switching between an adjustment of the offset voltage of said amplifying circuit, an adjustment of the output value of said bridge circuit and a measurement of the flow velocity.

15. The thermo-sensitive flow velocity sensor according to claim 12, further comprising a protective resistor connected between said sensor drive circuit and said first and second adjusting means.

16. The thermo-sensitive flow velocity sensor according to claim 12, further comprising a virtual load resistor having a resistance value approximate to that of said heating element connected at the output of said sensor drive circuit.

17. The thermo-sensitive flow velocity sensor according to claim 12, further comprising a common-emitter circuit having a resistance value approximate to that of said heating element connected at the output of said sensor drive circuit.

18. The thermo-sensitive flow velocity sensor according to claim 12, further comprising a common-source circuit having a resistance value approximate to that of said heating element connected at the output of said sensor drive circuit.

19. The thermo-sensitive flow velocity sensor according to claim 12, further comprising a variable resistor connected to said bridge circuit at a side opposite to a side to which said fluid temperature detecting element is connected.

20. A thermo-sensitive flow sensor comprising:

a microbridge formed across a trench on a substrate;

a heating element provided on said microbridge;

an upstream temperature detecting element provided upstream of said heating element in a gas flow direction;

a downstream temperature detecting element provided downstream of said heating element in the gas flow direction;

wherein a flow rate of the gas is measured by detecting a temperature difference between said upstream and downstream temperature detecting elements;

drive stopping means for stopping a power supply to said heating element;

a temperature-difference detecting bridge circuit including said upstream and downstream temperature detecting elements and reference resistors, each of the reference resistors being connected in series to a corresponding one of said upstream and downstream temperature detecting elements; and bridge adjusting means for providing an input to the temperature-difference detecting bridge circuit for performing an output adjustment of said temperature-difference detecting bridge circuit by, in a balancing mode, forming a closed loop of the sensor drive circuit and adjusting means while short-circuiting the temperature setting resistor and disconnecting the heating element, and then reconnecting the heating element and temperature setting resistor.

21. A thermo-sensitive flow sensor comprising:

a microbridge formed across a trench on a substrate;

a heating element provided on said microbridge;

an upstream temperature detecting element provided upstream of said heating element in a gas flow direction;

a downstream temperature detecting element provided downstream of said heating element in the gas flow direction;

wherein a flow rate of the gas is measured by detecting a temperature difference between said upstream and downstream temperature detecting elements;

drive stopping means for stopping a power supply to said heating element;

a temperature-difference detecting bridge circuit including said upstream and downstream temperature detecting elements and reference resistors, each of the reference resistors being connected in series to a corresponding one of said upstream and downstream temperature detecting elements; and bridge adjusting means for providing an input to the temperature-difference detecting bridge circuit for performing an output adjustment of said temperature-difference detecting bridge circuit while the power supply to said heating element is stopped by said drive stopping means;

wherein said bridge adjusting means includes a differential amplifier for amplifying a potential difference between output terminals of said temperature-difference detecting bridge circuit, an error detecting amplifier provided at an output side of said differential amplifier, a bridge circuit adjusting circuit provided between said error detecting amplifier and said temperature-difference detecting bridge circuit, switching means for switching connection states between said differential amplifier and said error detecting amplifier and between said error detecting amplifier and said bridge circuit adjusting circuit, and switching timing control means for controlling switching timings of said switching means and said drive stopping means before measurement of the gas flow rate.

22. The thermo-sensitive flow sensor according to claim 21, further comprising short-circuiting means for short-circuiting input terminals of said differential amplifier, and zero-adjusting means for adjusting an output value of said differential amplifier to zero while the power supply to said heating element is stopped by said drive stopping means and the input terminals of said differential amplifier are short-circuited by said short-circuiting means.

23. A thermo-sensitive flow sensor comprising:

a microbridge formed across a trench on a substrate;

a heating element provided on said microbridge;

an upstream temperature detecting element provided upstream of said heating element in a gas flow direction;

a downstream temperature detecting element provided downstream of said heating element in the gas flow direction;

wherein a flow rate of the gas is measured by detecting a temperature difference between said upstream and downstream temperature detecting elements;

drive stopping means for stopping a power supply to said heating element;

a temperature-difference detecting constant current circuit for feeding a constant current to each of said upstream and downstream temperature detecting elements; and constant current adjusting means for rendering voltages across said upstream temperature detecting element and said downstream temperature detecting element equal to each other while the power supply to said heating element is stopped by said drive stopping means.

24. The thermo-sensitive flow sensor according to claim 23, wherein said constant current adjusting means includes a differential amplifier for amplifying a difference between the voltages across said upstream temperature detecting element and said downstream temperature detecting element of said temperature-difference detecting constant current circuit, an error detecting amplifier provided at an output side of said differential amplifier, a constant current circuit adjusting circuit provided between said error detecting amplifier and said temperature-difference detecting constant current circuit, switching means for switching connection states between said differential amplifier and said error detecting amplifier and between said error detecting amplifier and said constant current circuit adjusting circuit, and switching timing control means for controlling switching timings of said switching means and said drive stopping means before measurement of the gas flow rate.

25. The thermo-sensitive flow sensor according to claim 24, further comprising short-circuiting means for short-circuiting input terminals of said differential amplifier, and zero-adjusting means for adjusting an output value of said differential amplifier to zero while the power supply to said heating element is stopped by said drive stopping means and the input terminals of said differential amplifier are short-circuited by said short-circuiting means.

26. A thermo-sensitive flow sensor comprising:

a fluid temperature detecting element provided on an electrically insulating film of a substrate;

a microbridge formed across a trench on said substrate;

a heating element provided on said microbridge;

a heating-element temperature detecting element provided near said heating element;

an upstream temperature detecting element provided upstream of said heating element in a gas flow direction;

a downstream temperature detecting element provided downstream of said heating element in the gas flow direction;

wherein a flow rate of the gas is measured by detecting a temperature difference between said upstream and downstream temperature detecting elements;

drive control means for controlling a power supply to said heating element so as to hold constant a temperature difference between said fluid temperature detecting element and said heating element temperature detecting element;

drive stopping means for stopping the power supply to said heating element;

a temperature-difference detecting bridge circuit including said upstream and downstream temperature detecting elements and reference resistors, each of the reference resistors being connected in series to a corresponding one of said upstream and downstream temperature detecting elements; and bridge adjusting means for providing an input to the temperature-difference detecting bridge circuit for performing an output adjustment of said temperature-difference detecting bridge circuit while the power supply to said heating element is stopped by said drive stopping means.

27. The thermo-sensitive flow sensor according to claim 26, wherein said bridge adjusting means includes a differential amplifier for amplifying a potential difference between output terminals of said temperature-difference detecting bridge circuit, an error detecting amplifier provided at an output side of said differential amplifier, a bridge circuit adjusting circuit provided between said error detecting amplifier and said temperature-difference detecting bridge circuit, switching means for switching connection states between said differential amplifier and said error detecting amplifier and between said error detecting amplifier and said bridge circuit adjusting circuit, and switching timing control means for controlling switching timings of said switching means and said drive stopping means before measurement of the gas flow rate.

28. The thermo-sensitive flow sensor according to claim 27, further comprising short-circuiting means for short-circuiting input terminals of said differential amplifier, and zero-adjusting means for adjusting an output value of said differential amplifier to zero while the power supply to said heating element is stopped by said drive stopping means and the input terminals of said differential amplifier are short-circuited by said short-circuiting means.

29. A thermo-sensitive flow sensor comprising:

a fluid temperature detecting element provided on an electrically insulating film of a substrate;

a microbridge formed across a trench on said substrate;

a heating element provided on said microbridge;

a heating-element temperature detecting element provided near said heating element;

an upstream temperature detecting element provided upstream of said heating element in a gas flow direction;

a downstream temperature detecting element provided downstream of said heating element in the gas flow direction;

wherein a flow rate of the gas is measured by detecting a temperature difference between said upstream and downstream temperature detecting elements;

drive control means for controlling a power supply to said heating element so as to hold constant a temperature difference between said fluid temperature detecting element and said heating element temperature detecting element;

drive stopping means for stopping the power supply to said heating element;

a temperature-difference detecting constant current circuit for feeding a constant current to each of said upstream and downstream temperature detecting elements; and constant current adjusting means for rendering voltages across said upstream temperature detecting element and said downstream temperature detecting element equal to each other while the power supply to said heating element is stopped by said drive stopping means.

30. The thermo-sensitive flow sensor according to claim 29, wherein said constant current adjusting means includes a differential amplifier for amplifying a difference between the voltages across said upstream temperature detecting element and said downstream temperature detecting element of said temperature-difference detecting constant current circuit, an error detecting amplifier provided at an output side of said differential amplifier, a constant current circuit adjusting circuit provided between said error detecting amplifier and said temperature-difference detecting constant current circuit, switching means for switching connection states between said differential amplifier and said error detecting amplifier and between said error detecting amplifier and said constant current circuit adjusting circuit, and switching timing control means for controlling switching timings of said switching means and said drive stopping means before measurement of the gas flow rate.

31. The thermo-sensitive flow sensor according to claim 30, further comprising short-circuiting means for short-circuiting input terminals of said differential amplifier, and zero-adjusting means for adjusting an output value of said differential amplifier to zero while the power supply to said heating element is stopped by said drive stopping means and the input terminals of said differential amplifier are short-circuited by said short-circuiting means.

32. A method of adjusting a thermo-sensitive flow sensor comprising a heating element, a heating element detecting element, a bridge circuit including a temperature detecting element and a temperature setting resistor, an operational amplifier to receive an output of the bridge circuit, and a first adjusting amplifier to receive an output of the operational amplifier and a reference voltage, and to input a first feedback signal to the bridge circuit, comprising the steps of:

disconnecting the heating element from the operational amplifier;

short-circuiting the temperature setting resistor and the operational amplifier;

first adjusting the bridge circuit until an output of the operational amplifier is equal to zero.

33. The method according to claim 32, wherein the flow sensor further comprises a second adjusting amplifier to receive an output of the operational amplifier and the reference voltage and to input a second feedback signal to the bridge circuit, further comprising steps of:

reconnecting the operational amplifier to the bridge circuit;

disconnecting the first adjusting amplifier from the bridge circuit; and second adjusting the bridge circuit until an output of the operational amplifier is equal to the reference voltage.

34. A method of adjusting a thermo-resistive flow sensor including a heating element, a heating element driving circuit connected to a power source, a heating element detecting element, a bridge circuit including an upstream and a downstream temperature detecting element, a differential amplifier to receive an output of the bridge circuit, and a first adjusting amplifier connected to receive an output from the differential amplifier and a reference voltage, and to input a first feedback signal to the bridge circuit, comprising the steps of:

stopping a supply of power to the heating element driving circuit;

short-circuiting the differential amplifier;

first adjusting the bridge circuit until an output of the differential amplifier becomes equals to zero.

35. The method according to claim 34, wherein the flow sensor further comprises a second adjusting amplifier to receive an output of the differential amplifier and the reference voltage, and to input a second feedback signal to the bridge circuit, further comprising the steps of:

reconnecting the differential amplifier to the bridge circuit;

disconnecting the first adjusting amplifier from the bridge circuit; and second adjusting the bridge circuit so that an output of the amplifier is equal to the reference voltage.

* * * * *